(12) United States Patent
Lee et al.

(10) Patent No.: US 10,409,117 B2
(45) Date of Patent: Sep. 10, 2019

(54) LIQUID CRYSTAL DISPLAY

(71) Applicant: Samsung Display Co., Ltd., Yongin-si (KR)

(72) Inventors: Sun Hwa Lee, Yongin-si (KR); Kwang-Chul Jung, Seongnam-si (KR); Mee-Hye Jung, Suwon-si (KR)

(73) Assignee: Samsung Dispiay Co., Ltd., Yongin-si (KR)

( * ) Notice: Subject to any disclaimer, the term of this patent is extended or adjusted under 35 U.S.C. 154(b) by 0 days.

(21) Appl. No.: 15/043,972

(22) Filed: Feb. 15, 2016

(65) Prior Publication Data
US 2016/0238904 A1    Aug. 18, 2016

(30) Foreign Application Priority Data

Feb. 17, 2015  (KR) .................. 10-2015-0024466

(51) Int. Cl.
| | |
|---|---|
| *G02F 1/1343* | (2006.01) |
| *G02F 1/1337* | (2006.01) |
| *G02F 1/1333* | (2006.01) |
| *G02F 1/1362* | (2006.01) |
| *G02F 1/139* | (2006.01) |

(52) U.S. Cl.
CPC .. *G02F 1/134309* (2013.01); *G02F 1/133707* (2013.01); *G02F 1/134336* (2013.01); *G02F 1/1393* (2013.01); *G02F 1/13624* (2013.01); *G02F 1/133305* (2013.01); *G02F 2001/134345* (2013.01)

(58) Field of Classification Search
CPC ......... G02F 1/134309; G02F 1/133707; G02F 1/134336; G02F 1/133305; G02F 2001/134345; G02F 1/13624; G02F 1/1393; G02F 2201/123; G02F 2001/13
See application file for complete search history.

(56) References Cited

U.S. PATENT DOCUMENTS

| | | |
|---|---|---|
| 8,098,358 B2 | 1/2012 | Kim et al. |
| 2004/0100607 A1 | 5/2004 | Kawata et al. |

(Continued)

FOREIGN PATENT DOCUMENTS

| | | | |
|---|---|---|---|
| EP | 2749931 A1 * | 7/2014 | ....... G02F 1/133305 |
| KR | 1020040016404 | 2/2004 | |

(Continued)

OTHER PUBLICATIONS

Extended European Search Report dated Nov. 9, 2016, in the European Patent Application No. 16156051.1.

(Continued)

*Primary Examiner* — Paisley L Arendt
*Assistant Examiner* — Mariam Qureshi
(74) *Attorney, Agent, or Firm* — H.C. Park & Associates, PLC

(57) ABSTRACT

A liquid crystal display includes: a first substrate; and pixel electrodes disposed on the first substrate, each of the pixel electrodes including: a stem including a first stem and a second stem perpendicularly crossing each other; and a plurality of branch electrodes extending from the stem, wherein one of the first stem of and the second stem of each pixel electrode has a different width corresponding to a location of pixel electrodes on the display.

31 Claims, 23 Drawing Sheets

(56) References Cited

U.S. PATENT DOCUMENTS

| | | | | |
|---|---|---|---|---|
| 2010/0157186 A1* | 6/2010 | Kim | ................. | G02F 1/134336 |
| | | | | 349/39 |
| 2010/0253897 A1* | 10/2010 | Ohgami | ............ | G02F 1/134309 |
| | | | | 349/142 |
| 2011/0242443 A1 | 10/2011 | Choi et al. | | |
| 2013/0194536 A1* | 8/2013 | Tae | .................. | G02F 1/133707 |
| | | | | 349/143 |
| 2013/0321740 A1 | 12/2013 | An et al. | | |
| 2015/0029449 A1 | 1/2015 | Woo et al. | | |
| 2015/0062516 A1 | 3/2015 | Jung et al. | | |
| 2016/0005347 A1* | 1/2016 | Chen | ................. | G02F 1/133707 |
| | | | | 345/88 |
| 2016/0282680 A1* | 9/2016 | Hao | ................. | G02F 1/133514 |

FOREIGN PATENT DOCUMENTS

| | | |
|---|---|---|
| KR | 1020090103461 | 10/2009 |
| KR | 1020100061120 | 6/2010 |
| KR | 1020100072852 | 7/2010 |

OTHER PUBLICATIONS

Partial European Search Report dated Aug. 3, 2016 in European Patent Application No. 16156051.1.

* cited by examiner

FIG. 10B
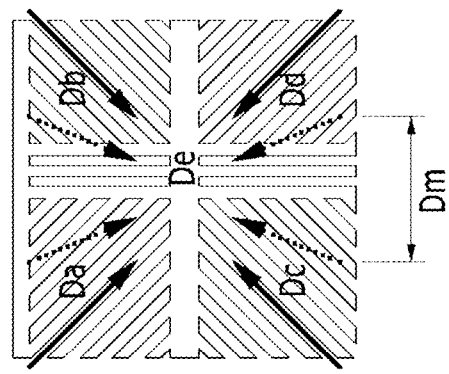
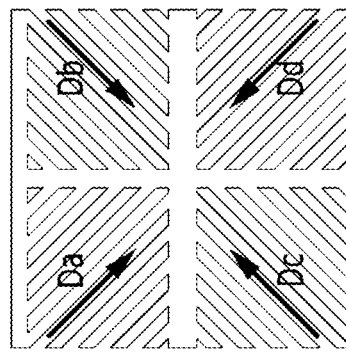
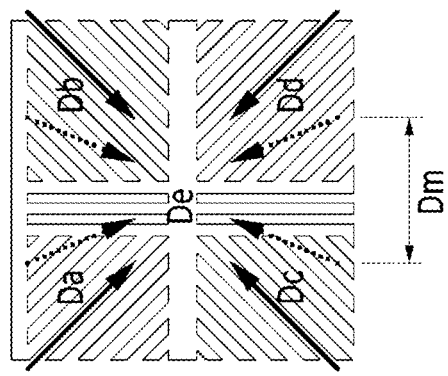

LIQUID CRYSTAL DISPLAY

CROSS-REFERENCE TO RELATED APPLICATION

This application claims priority from and the benefit of Korean Patent Application No. 10-2015-0024466, filed on Feb. 17, 2015, which is hereby incorporated by reference for all purposes as if fully set forth herein.

BACKGROUND

Field

Exemplary embodiments relate to a liquid crystal display.

Discussion of the Background

A liquid crystal display is a kind of flat panel display that is widely used. The liquid crystal display includes two display panels having field generating electrodes such as pixel electrodes and common electrodes, and a liquid crystal layer interposed between the display panels. In the liquid crystal display, a voltage is applied to the field generating electrodes to generate an electric field in the liquid crystal layer, which determines the direction of liquid crystal molecules of the liquid crystal layer, and an image is displayed by controlling the polarization of incident light by determining the direction of liquid crystal molecules.

Among the LCDs, a vertical alignment (VA) mode LCD aligns LC molecules such that their long axes are perpendicular to the panels in the absence of an electric field. The VA mode LCD has a high contrast ratio and a wide reference viewing angle.

In the VA mode liquid crystal display, to obtain the wide viewing angle, each pixel includes a plurality of domains in which the alignment directions of the liquid crystal molecules are pretilted different to each other.

When a misalignment of two substrates of the liquid crystal display including the plurality of domains is generated, the misalignment of the liquid crystal molecules is generated at the domain boundary, and the misalignment causes a display quality deterioration of the liquid crystal display.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display having reduced display quality deterioration even when two display electrodes of the liquid crystal display are misaligned.

Additional aspects will be set forth in the detailed description which follows, and, in part, will be apparent from the disclosure, or may be learned by practice of the inventive concept.

An exemplary embodiment discloses a liquid crystal display including: a first substrate; and pixel electrodes disposed on the first substrate, each of the pixel electrodes including: a stem including a first stem and a second stem perpendicularly crossing each other; and a plurality of branch electrodes extending from the stem, wherein one of the first stem of and the second stem of each pixel electrode has a different width corresponding to a location of pixel electrodes on the display.

An exemplary embodiment also discloses a liquid crystal display including: a first substrate; a gate line and a data line disposed on the first substrate; a first pixel disposed on the first substrate, the first pixel including a first domain, a second domain, a third domain, and a fourth domain; second pixels and third pixels disposed on the first substrate, the second pixels and the third pixels respectively including a first domain, a second domain, a third domain, a fourth domain, and a fifth domain; and a liquid crystal layer including liquid crystal molecules, wherein the liquid crystal molecules disposed in the first domain, the second domain, the third domain, and the fourth domain of the first pixel, second pixels, and third pixels are respectively inclined in four different directions with reference to the gate line and the data line, and wherein the width of the fifth domain of the second pixels and the third pixels are different corresponding to a location of the second pixels and the third pixels.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 10A and FIG. 10B are conceptual views showing a movement of liquid crystal molecules of a liquid crystal display, according to one or more exemplary embodiments.

DETAILED DESCRIPTION OF THE ILLUSTRATED EMBODIMENTS

Figure 1:
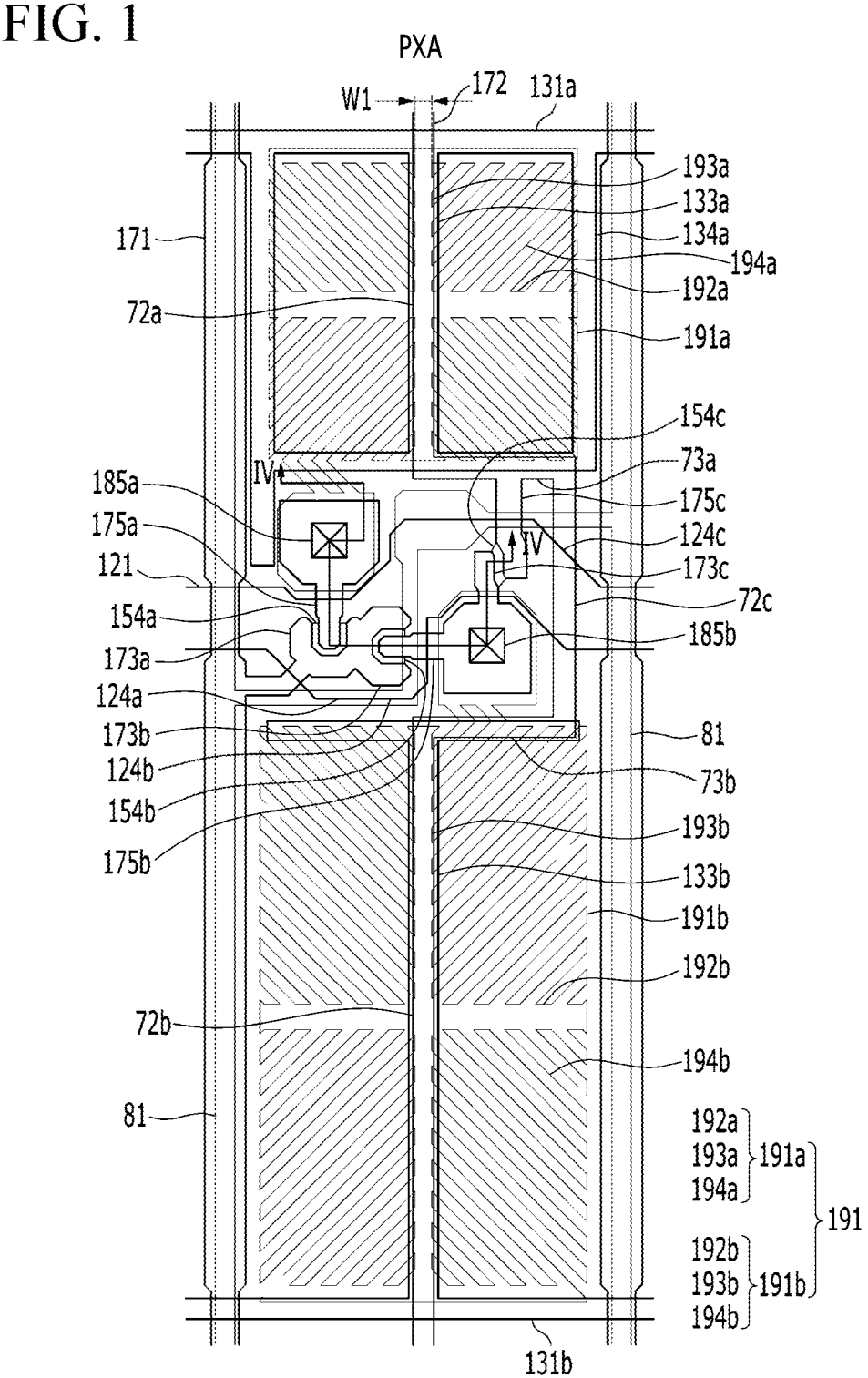
FIG. 1 is a plan view illustrating a layout of a first pixel of a liquid crystal display, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region disposed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

First, a structure of a first pixel PXA of a liquid crystal display according to one or more exemplary embodiments will be described with reference to FIG. 1 and FIG. 4. FIG. 1 is a plan view illustrating a layout of a first pixel PXA of a liquid crystal display according to the exemplary embodiments, and FIG. 4 is a cross-sectional view of the liquid crystal display of FIG. 1 taken along a sectional line IV-IV.

Figure 4:
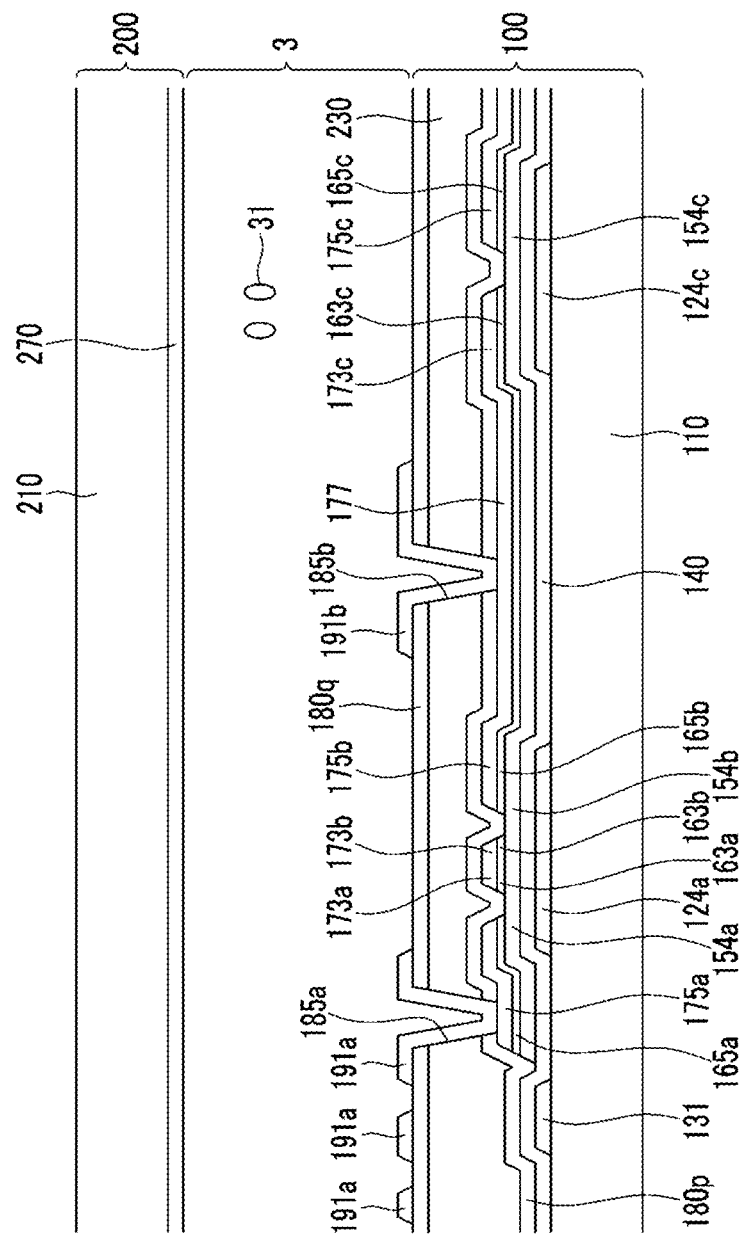
FIG. 4 is a cross-sectional view of the liquid crystal display of FIG. 1 taken along a sectional line IV-IV.

Referring to FIG. 1 and FIG. 4, the liquid crystal display according to the present exemplary embodiments includes a lower panel 100 and an upper panel 200 disposed facing to each other, a liquid crystal layer 3 interposed between the lower and upper display panels 100 and 200, and a pair of polarizers (not shown) attached to outer surfaces of the lower and upper display panels 100 and 200.

First, the lower panel 100 will be described.

A gate conductor including a gate line 121 and storage voltage lines 131a and 131b are disposed on an insulation substrate 110 made of transparent glass and/or plastic. The gate line 121 includes a first gate electrode 124a, a second gate electrode 124b, and a third gate electrode 124c. The storage voltage lines 131a and 131b include a first storage voltage line 131a and a second storage voltage line 131b. The first storage voltage line 131a includes a first storage electrode 133a and a second storage electrode 134a, and the second storage voltage line 131b includes a third storage electrode 133b.

A gate insulating layer 140 is disposed on the gate line 121 and the storage voltage lines 131a and 131b. A first semiconductor 154a, a second semiconductor 154b, and a third semiconductor 154c are disposed on the gate insulating layer 140. A plurality of ohmic contacts 163a, 165a, 163b, 165b, 163c, and 165c are disposed on the semiconductors 154a, 154b, and 154c.

A data conductor including a data line 171, a division voltage reference voltage line 172, a first source electrode 173a, a second source electrode 173b, a first drain electrode 175a, a second drain electrode 175b, a third source electrode 173c, and a third drain electrode 175c is disposed on the ohmic contacts 163a, 165a, 163b, 165b, 163c, and 165c and the gate insulating layer 140.

The first source electrode 173a and the second source electrode 173b extend from the data line 171. The third drain electrode 175c extends from the division voltage reference voltage line 172.

The division voltage reference voltage line 172 includes a first vertical portion 72a extending parallel to the data line 171 and overlapping the first storage electrode 133a, a second vertical portion 72b extending parallel to the data line and overlapping the third storage electrode 133b, a third vertical portion 72c connecting a first horizontal portion 73a and a second horizontal portion 73b, the first horizontal portion 73a connecting the first vertical portion 72a and the third vertical portion 72c to each other, and the second horizontal portion 73b connecting the second vertical portion 72b and the third vertical portion 72c to each other.

The data conductor, the semiconductor, and ohmic contacts may be simultaneously disposed by using one mask.

The first gate electrode 124a, the first source electrode 173a, the first drain electrode 175a, and the first semiconductor island 154a form a first thin film transistor (TFT), and a channel of the first TFT is disposed in the semiconductor 154a between the first source electrode 173a and the first drain electrode 175a. The second gate electrode 124b, the second source electrode 173b, the second drain electrode 175b, and a second semiconductor island 154b form a second TFT, and a channel of the second TFT is disposed in the semiconductor 154b between the second source electrode 173b and the second drain electrode 175b. The third gate electrode 124c, the third source electrode 173c, the third drain electrode 175c and a third semiconductor island 154c form a third TFT, and a channel of the third TFT is disposed in the semiconductor 154c between the third source electrode 173c and the third drain electrode 175c.

The second drain electrode 175b is connected to the third source electrode 173c.

A first passivation layer 180p is disposed on the data conductor and the exposed portion of the semiconductors 154a, 154b, and 154c. The first passivation layer 180p may include an inorganic insulating layer such as a silicon nitride and/or a silicon oxide. The first passivation layer 180p may limit or prevent a pigment of color filter 230 from dissipating into the exposed portion of the semiconductors 154a, 154b, and 154c.

A color filter 230 is disposed on the first passivation layer 180p. The color filter 230 extends in a vertical direction along with two adjacent data lines. Although not shown, a light blocking member (not shown) may be disposed in the lower display panel 100. However, exemplary embodiments are not limited thereto, and at least one of the color filter 230 and the light blocking member may be disposed on the upper display panel 200 rather than the lower display panel 100. When the color filter 230 is disposed on the second display panel 200, the first passivation layer 180p may be formed of an organic layer.

A second passivation layer 180q is disposed on the color filter 230. The second passivation layer 180q may include the inorganic insulating layer such as a silicon nitride and/or a silicon oxide. The second passivation layer 180q may limit or prevent peeling of the color filter 230 and suppress contamination of the liquid crystal layer 3 by the organic material of the solvent that may dissipate from the color filter 230, so that it may limit or prevent defects such as afterimages of an image displayed.

A first contact hole 185a and a second contact hole 185b, through which the first drain electrode 175a and the second drain electrode 175b are respectively exposed, are disposed in both of the first passivation layer 180p and the second passivation layer 180q.

A plurality of pixel electrodes 191 (191a, 191b) and a plurality of shielding electrodes 81 are disposed on the second passivation layer 180q. The pixel electrodes 191 includes the first sub-pixel electrode 191a and the second sub-pixel electrode 191b disposed adjacent in a column direction with reference to the gate line 121. In other words first and second sub-pixel electrodes 191a and 191b are separated from each other with the gate line 121 interposed therebetween. The pixel electrode 191 may be formed of a transparent material such as ITO and/or IZO. The pixel electrode 191 may be made of a transparent conductive material such as ITO and/or IZO, or a reflective metal including at least one of aluminum, silver, chromium, and an alloy thereof.

Figure 5:
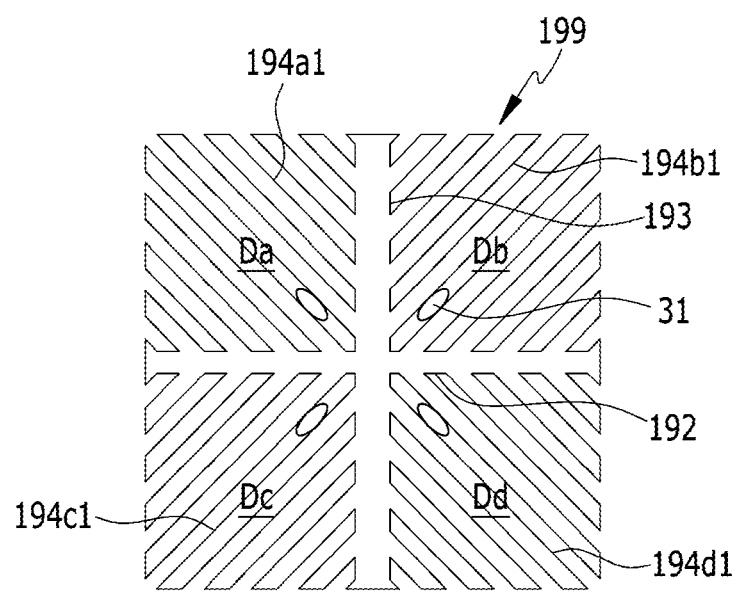
FIG. 5 is a top plan view illustrating a representative shape of a first and second sub-pixel electrode of the first pixel of a liquid crystal display, according to the exemplary embodiments.

The first and second sub-pixel electrode of the pixel electrode 191 of the first pixel PXA may have a representative shape 199 illustrated in FIG. 5 or one or more modifications thereof.

An entire shape of a first sub-pixel electrode 191a of the pixel electrode 191 of the first pixel PXA is a quadrangle, and includes a cross-shaped stem including a first horizontal stem 192a and a first vertical stem 193a, and a plurality of branch electrodes 194a extending from the cross-shaped stem.

An entire shape of the second sub-pixel electrode 191b of the pixel electrode 191 of the first pixel PXA is a quadrangle, and includes the cross-shaped stem including a second horizontal stem 192b and a second vertical stem 193b, and a plurality of branch electrodes 194b extending from the cross-shaped stem.

The first vertical stem 193a of the first sub-pixel electrode 191a of the first pixel PXA overlaps the first vertical portion 72a of the division voltage reference voltage line 172, and the second vertical stem 193b of the second sub-pixel electrode 191b of the first pixel PXA overlaps the division voltage reference voltage line 172 of the second vertical portion 72b.

The first sub-pixel electrode 191a and the second sub-pixel electrode 191b are electrically and physically connected to the first drain electrode 175a and the second drain electrode 175b, respectively, through the first contact hole 185a and the second contact hole 185b, thereby receiving the data voltage from the first drain electrode 175a and the second drain electrode 175b, respectively. A portion of the data voltage applied to the second drain electrode 175b is divided through the third source electrode 173c via connection 177, and thus a data voltage applied to the first sub-pixel electrode 191a is larger than a data voltage applied to the second sub-pixel electrode 191b.

The first sub-pixel electrode 191a and the second sub-pixel electrode 191b to which the data voltage is applied generate an electric field together with a common electrode 270 of the upper display panel 200 to determine a direction of the liquid crystal molecules 31 of the liquid crystal layer 3 between the pixel electrode 191 and the common electrode 270. The luminance of light passing through the liquid crystal layer 3 may be controlled according to the direction of the liquid crystal molecules 31.

Next, the upper panel 200 will be described. The upper panel 200 includes the common electrode 270 disposed on an insulation substrate 210. An upper alignment layer (not shown) is disposed on the common electrode 270. The upper alignment layer may be a vertical alignment layer.

The liquid crystal layer 3 has negative dielectric anisotropy. The liquid crystal molecules 31 of the liquid crystal layer 3 are arranged such that a vertical axis of the liquid crystal molecules may be perpendicular to the surfaces of the lower and upper panels 100 and 200 in the case in which an electric field does not exist.

Next, the representative shape 199 of the first and second sub-pixel electrode of the first pixel PXA of the liquid crystal display according to the exemplary embodiments will be described with reference to FIG. 5.

Referring to FIG. 5, the entire shape of the representative shape 199 of the first pixel PXA is a quadrangle, and includes the cross-shaped stem including a horizontal stem 192 and a vertical stem 193 crossing the horizontal stem 192. The horizontal stem 192 corresponds with the first horizontal stem 192a and the second horizontal stem 192b of the first pixel PXA, and the vertical stem 193 corresponds with the first vertical stem 193a and the second vertical stem 193b of the first pixel PXA. Further, the representative shape 199 is divided into a first subregion Da, a second subregion Db, a third subregion Dc, and a fourth subregion Dd, by the horizontal stem 192 and the vertical stem 193, and each of the subregions Da, Db, Dc, and Dd respectively includes first minute branches 194a1, second minute branches 194b1, third minute branches 194c1, and fourth minute branches 194d1.

The first minute branches 194a1 extend diagonally in an upper left direction from the horizontal stem 192 or the vertical stem 193, and the second minute branches 194b1 extend diagonally in an upper right direction from the horizontal stem 192 or the vertical stem 193. The third minute branches 194c1 extend diagonally in a lower left direction from the horizontal stem 192 or the vertical stem 193, and the fourth minute branches 194d1 extend diagonally in a lower right direction from the horizontal stem 192 or the vertical stem 193.

The first to fourth minute branches 194a1, 194b1, 194c1, and 194d1 form an angle of approximately 45° or 135° with the gate lines 121 or the horizontal stem 192. Further, the minute branches 194a1, 194b1, 194c1, and 194d1 of two adjacent subregions Da, Db, Dc, and Dd may be orthogonal to each other.

The first subpixel electrode 191a and the second subpixel electrode 191b are connected to the first drain electrode 175a and the second drain electrode 175b through the first contact hole 185a and the second contact hole 185b, respectively, and receive the data voltage from the first drain electrode 175a and the second drain electrode 175b, respectively. Sides of the first to fourth fine branch portions 194a1, 194b1, 194c1, and 194d1 distort an electric field to generate a horizontal component determining an inclination direction of the liquid crystal molecules 31. The horizontal component of the electric field is substantially parallel to the sides of the first to fourth minute branches 194a1, 194b1, 194c1, and 194d1, and accordingly, the liquid crystal molecules 31 are inclined in the direction substantially perpendicular to the sides of the first to fourth minute branch portions 194a1, 194b1, 194c1, and 194d1, and collide with each other, thereby being inclined in the direction parallel to the length direction of the minute branch portions 194a1, 194b1, 194c1, and 194d1. Since one pixel electrode 191 includes four subregions Da, Db, Dc, and Dd in which the minute branches 194a1, 194b1, 194c1, and 194d1 extend in different directions from each other, the liquid crystal molecules 31 includes four domains in which the liquid crystal molecules 31 of the liquid crystal layer 3 may be inclined in four different directions. As described above, the inclination direction of the liquid crystal molecules may be diversified, and therefore, the liquid crystal display may have an increased viewing angle.

Figure 2:
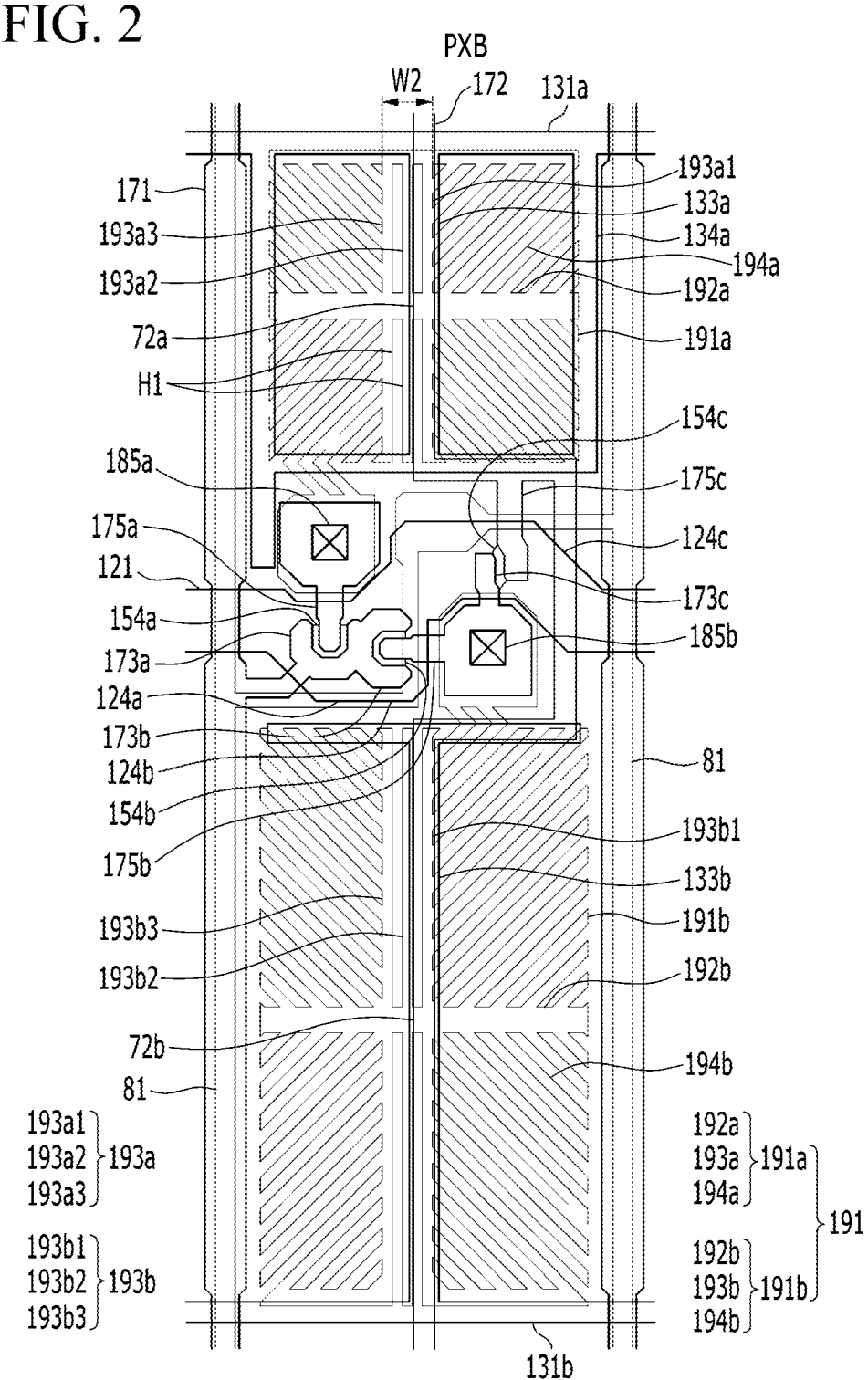
FIG. 2 is a plan view illustrating a layout of a second pixel of a liquid crystal display, according to one or more exemplary embodiments.

Next, the structure of the second pixel PXB of the liquid crystal display according to the exemplary embodiments will be described with reference to FIG. 2 and FIG. 6. FIG. 2 is a plan view of a layout of the second pixel of a liquid crystal display according to the exemplary embodiments, and FIG. 6 is a top plan view illustrating a representative shape 199 of the first and second sub-pixel electrodes of a second pixel of a liquid crystal display according to the exemplary embodiments.

Figure 6:
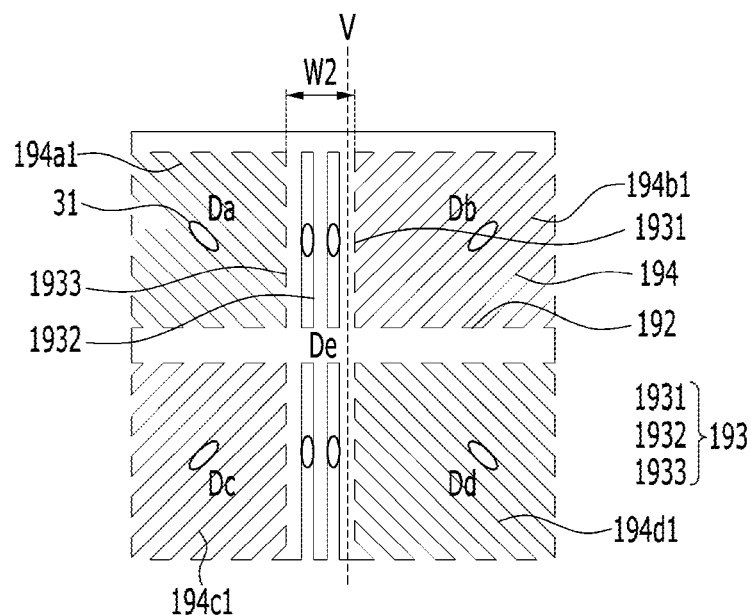
FIG. 6 is a top plan view illustrating a representative shape of a first and second sub-pixel electrode of the second pixel of a liquid crystal display, according to the exemplary embodiments.

Referring to FIG. 2 and FIG. 6, the structure of the second pixel PXB of the liquid crystal display according to the exemplary embodiments is substantially similar to the structure of the first pixel PXA. The detailed description of the elements and the structure that are substantially similar to the first pixel PXA may be omitted.

However, referring to FIG. 2 and FIG. 6, the shape of the pixel electrode 191 of the second pixel PXB of the liquid crystal display according to the exemplary embodiments is different from the above-described first pixel PXA. This will be described in detail.

Referring to FIG. 2, the entire shape of the first sub-pixel electrode 191a of the pixel electrode 191 of the second pixel PXB is a quadrangle, and includes the cross-shaped stem including the first horizontal stem 192a and the first vertical stem 193a and the plurality of branch electrodes 194a extending from the cross-shaped stem.

The entire shape of the second sub-pixel electrode 191b of the pixel electrode 191 of the second pixel PXB is a quadrangle, and includes the cross-shaped stem including the second horizontal stem 192b and the second vertical stem 193b and the plurality of branch electrodes 194b extending from the cross-shaped stem.

The first vertical stem 193a of the first sub-pixel electrode 191a of the second pixel PXB includes a plurality of first vertical branch portions 193a1, 193a2, and 193a3 disposed along the first vertical stem 193a and extending parallel to each other spaced apart by first openings H1.

The second vertical stem 193b of the second sub-pixel electrode 191b of the second pixel PXB includes a plurality of second vertical branch portions 193b1, 193b2, and 193b3 disposed along the second vertical stem 193b and extending parallel to each other spaced apart by the first openings H1.

Also, the second width W2 of the first vertical stem 193a and the second vertical stem 193b of the second pixel PXB is larger than the first width W1 (FIG. 1) of the first vertical stem 193a and the second vertical stem 193b of the first sub-pixel electrode 191a of the first pixel PXA.

The first vertical branch portion 193a1 of the first vertical stem 193a of the first sub-pixel electrode 191a of the second pixel PXB overlaps the first vertical portion 72a of the division voltage reference voltage line 172, and the rest of the vertical branch portions 193a2 and 193a3 of the first vertical stem 193a are disposed on one side with reference to the first vertical portion 72a of the division voltage reference voltage line 172. Referring to FIG. 2, the rest of the branch portions 193a2 and 193a3 of the first vertical stem 193a are disposed on the left side with reference to of the first vertical portion 72a of the division voltage reference voltage line 172.

Similarly, the second vertical branch portion 193b1 of the second vertical stem 193b of the second sub-pixel electrode 191b of the second pixel PXB overlaps the second vertical portion 72b of the division voltage reference voltage line 172, and rest of the branch portions 193b2 and 193b3 of the second vertical stem 193b are disposed on one side with reference to the second vertical portion 72b of the division voltage reference voltage line 172. Referring to FIG. 2, the rest of the branch portions 193b2 and 193b3 of the second vertical stem 193b are positioned on the left side with reference to the second vertical portion 72b of the division voltage reference voltage line 172.

Accordingly, the first vertical stem 193a and the second vertical stem 193b of the second pixel PXB, which include a plurality of vertical branch portions separated by the openings, are wider than the first vertical stem 193a and the second vertical stem 193b of the first pixel PXA. The first vertical branch portion 193a1 of the plurality of first vertical branch portions 193a1, 193a2, and 193a3 of the first vertical stem 193a and the second vertical branch portion 193b1 of the plurality of second vertical branch portions 193b1, 193b2, and 193b3 of the second vertical stem 193b are disposed overlapping the vertical portions 72a and 72b of the sub-pixel electrode 191a and 191b of the division voltage reference voltage line 172, and the rest of the plurality of vertical branch portions are all disposed on one side with reference to the vertical portion 72a and 72b of the division voltage reference voltage line 172.

Next, the representative shape 199 of the first and second sub-pixel electrode of the second pixel PXB of the liquid crystal display according to the exemplary embodiments will be described with reference to FIG. 6.

Referring to FIG. 6, the entire shape of the representative shape 199 of the second pixel PXB is a quadrangle, and includes the cross-shaped stem including the horizontal stem 192 and the vertical stem 193 crossing the horizontal stem 192. The horizontal stem 192 corresponds with the first horizontal stem 192a and the second horizontal stem 192b of the second pixel PXB, and the vertical stem 193 corresponds with the first vertical stem 193a and the second vertical stem 193b of the second pixel PXB. Further, the representative shape 199 is divided into a first subregion Da, a second subregion Db, a third subregion Dc, a fourth subregion Dd, and a fifth region De by the horizontal stem 192 and the vertical stem 193, and the subregions Da, Db, Dc, and Dd each includes the first minute branches 194a1, the second minute branches 194b1, the third minute branches 194c1, and the fourth minute branches 194d1, respectively. The fifth region De includes vertical branch portions 1931, 1932, and 1933. The vertical branch portions 1931, 1932, and 1933 respectively corresponds with the plurality of first vertical branch portions 193a1, 193a2, and 193a3 of the second vertical branch portions 193b1, 193b2, and 193b3, respectively.

Referring to FIG. 6 with reference to FIG. 5, the second width W2 of the vertical stem 193 of the second pixel PXB is larger than the first width W1 (FIG. 1) of the vertical stem 193 of the first pixel PXA. Also, the vertical stem 193 of the second pixel PXB includes the plurality of vertical branch portions 1931, 1932, and 1933 separated by the opening disposed along with the length direction of the vertical stem 193 and extending parallel to each other. The portion of a plurality of vertical branch portions 1931, 1932, and 1933 of the vertical stem 193 of the second pixel PXB is disposed on one side with reference to a vertical center line V of the representative shape 199. Referring to FIG. 6, one vertical branch portion 1931 of the plurality of vertical branch portions 1931, 1932, and 1933 of the vertical stem 193 of the second pixel PXB overlaps the vertical center line V of the representative shape 199, and the rest of the vertical branch portions 1932 and 1933 of the vertical stem 193 are all disposed on the left side with reference to the vertical center line V of the representative shape 199.

The first minute branches 194a1 extend diagonally in an upper left direction from the horizontal stem 192 or the vertical stem 193, and the second minute branches 194b1 extend diagonally in an upper right direction from the horizontal stem 192 or the vertical stem 193. Further, the third minute branches 194c1 extend in a lower left direction from the horizontal stem 192 or the vertical stem 193, and the fourth minute branches 194d1 extend diagonally in a lower right direction from the horizontal stem 192 or the vertical stem 193.

The first to fourth minute branches 194a1, 194b1, 194c1, and 194d1 form an angle of approximately 45° or 135° with the gate lines 121 or the horizontal stem 192. Further, the minute branches 194a1, 194b1, 194c1, and 194d1 of the adjacent subregions Da, Db, Dc, and Dd may be orthogonal to each other.

The pixel electrode 191 is applied with the data voltage, and in this case, the sides of the first to fourth fine branch portions 194a1, 194b1, 194c1, and 194d1 and the sides of the plurality of vertical branch portions 1931, 1932, and 1933 of the vertical stem 193 distort the electric field to generate the horizontal component determining the inclination direction of the liquid crystal molecules 31. The horizontal component of the electric field is substantially parallel to the sides of the first to fourth minute branches 194a1, 194b1, 194c1, and 194d1, and the sides of the plurality of vertical branch portions 1931, 1932, and 1933 of the vertical stem 193, accordingly, the liquid crystal molecules 31 are inclined in the direction substantially perpendicular to the sides of the first to fourth minute branch portions 194a1, 194b1, 194c1, and 194d1 and the sides of the plurality of vertical branch portions 1931, 1932, and 1933 of the vertical stem 193, and collide with each other, thereby being inclined in the direction substantially parallel to the length direction of the minute branch portions 194a1, 194b1, 194c1, and 194d1 and the length direction of the vertical stem 193. Since one pixel electrode 191 of the second pixel PXB includes five subregions including the four subregions Da, Db, Dc, and Dd in which the minute branches 194a1, 194b1, 194c1, and 194d1 extend in different directions from each other and a fifth subregion De including the vertical stem 193, the liquid crystal molecules 31 includes five domains in which the liquid crystal molecules 31 of the liquid crystal layer 3 may be inclined in substantially five directions.

Particularly, in the fifth subregion De including the vertical stem 193, the inclination direction of the liquid crystal molecules 31 form an angle within substantially 45° with respect to the inclination direction of the liquid crystal molecules 31 in the first to fourth subregions Da, Db, Dc, and Dd. The fifth subregion De is disposed biased to one side with reference to the vertical center line V of the representative shape 199, and as shown in FIG. 6, the fifth subregion De of the second pixel PXB is disposed on the left side with reference to the vertical center line V of the representative shape 199.

Figure 3:
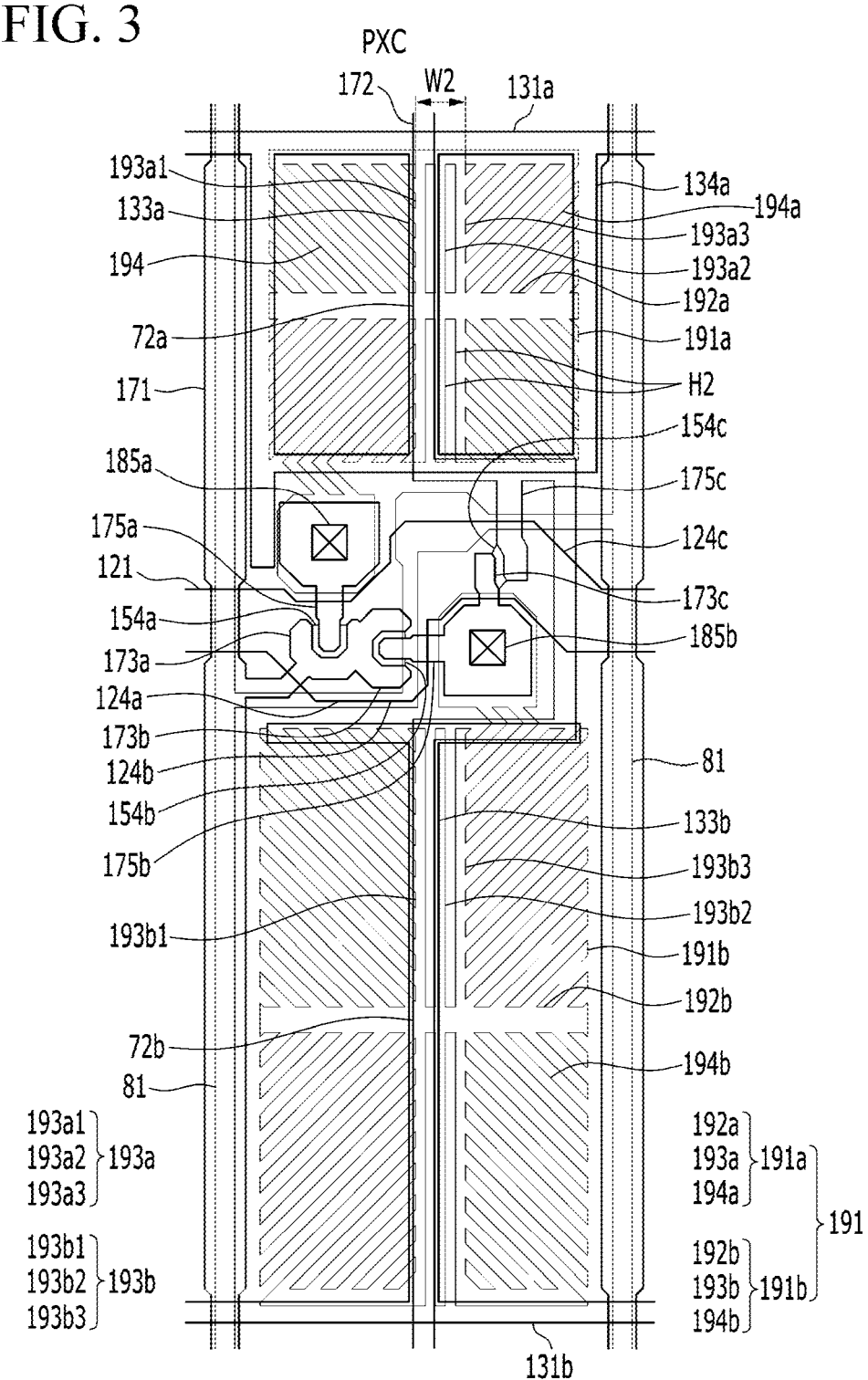
FIG. 3 is a plan view illustrating a layout of a third pixel of a liquid crystal display, according to one or more exemplary embodiments.

Next, the structure of the third pixel PXC of the liquid crystal display according to the exemplary embodiments will be described with reference to FIG. 3 and FIG. 7. FIG. 3 is a plan view of a layout of the third pixel of a liquid crystal display according to the exemplary embodiments, and FIG. 7 is a top plan view illustrating a representative shape 199 of the first and second sub-pixel electrodes of a third pixel of a liquid crystal display, according to the exemplary embodiments.

Figure 7:
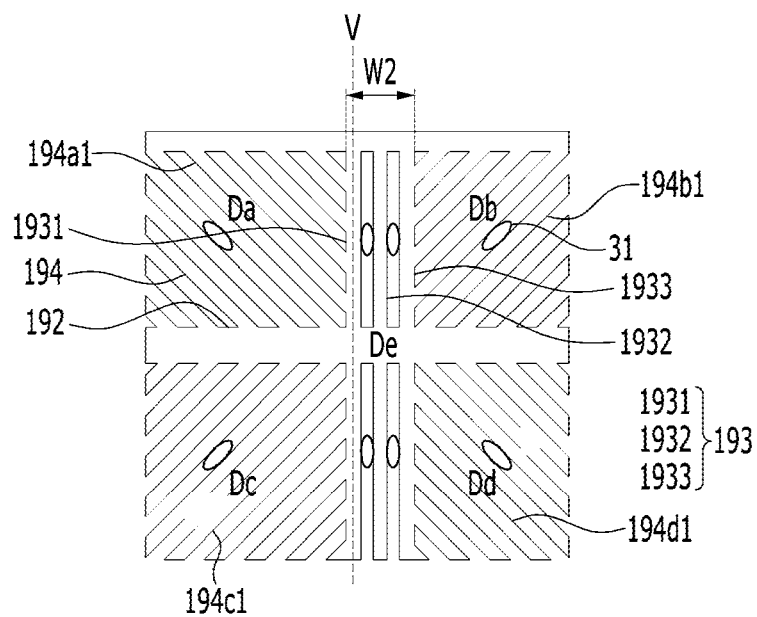
FIG. 7 is a top plan view illustrating a representative shape of a first and second sub-pixel electrode of the third pixel of a liquid crystal display, according to the exemplary embodiments.

Referring to FIG. 3 and FIG. 7, the structure of the third pixel PXC of the liquid crystal display according to the exemplary embodiments is substantially similar to the structure of the first pixel PXA. The detailed description of the elements and structure that are substantially similar to the first pixel PXA may be omitted.

However, referring to FIG. 3 and FIG. 7, the shape of the pixel electrode 191 of the third pixel PXC of the liquid crystal display according to the exemplary embodiments is different from the above-described first pixel PXA. This will be described in detail.

Referring to FIG. 3, the entire shape of the first sub-pixel electrode 191a of the pixel electrode 191 of the third pixel PXC is a quadrangle, and includes the cross-shaped stem including the first horizontal stem 192a and the first vertical stem 193a and the plurality of branch electrodes 194a extending from the cross-shaped stem.

The entire shape of the second sub-pixel electrode 191b of the pixel electrode 191 of the third pixel PXC is a quadrangle, and includes the cross-shaped stem including the second horizontal stem 192b and the second vertical stem 193b and the plurality of branch electrodes 194b extending from the cross-shaped stem.

The first vertical stem 193a of the first sub-pixel electrode 191a of the third pixel PXC includes a plurality of first vertical branch portions 193a1, 193a2, and 193a3 disposed along the first vertical stem 193a and extending parallel to each other spaced apart by second openings H2.

The second vertical stem 193b of the second sub-pixel electrode 191b of the third pixel PXC includes a plurality of second vertical branch portions 193b1, 193b2, and 193b3 disposed along the second vertical stem 193b and extending parallel to each other spaced apart by the second openings H2.

Also, the first width W1 of the first vertical stem 193a and the second vertical stem 193b of the first sub-pixel electrode 191a of the first pixel PXA is larger than the second width W2 of the first vertical stem 193a and the second vertical stem 193b of the first pixel PXA.

The first vertical branch portion 193a1 of the first vertical stem 193a of the first sub-pixel electrode 191a of the third pixel PXC overlaps the first vertical portion 72a of the division voltage reference voltage line 172, and the rest of the vertical branch portions 193a2 and 193a3 of the first vertical stem 193a are disposed on one side with reference to the first vertical portion 72a of the division voltage reference voltage line 172. Referring to FIG. 3, the rest of the branch portions 193a2 and 193a3 of the first vertical stem 193a are disposed on the right side with reference to the first vertical portion 72a of the division voltage reference voltage line 172.

Similarly, the second vertical branch portion 193b1 of the second vertical stem 193b of the second sub-pixel electrode 191b of the third pixel PXC overlaps the second vertical portion 72b of the division voltage reference voltage line 172, and rest of the branch portions 193b2 and 193b3 of the second vertical stem 193b are disposed on one side with reference to the second vertical portion 72b of the division voltage reference voltage line 172. Referring to FIG. 3, the rest of the branch portions 193b2 and 193b3 of the second vertical stem 193b are positioned on the right side with reference to the second vertical portion 72b of the division voltage reference voltage line 172.

Accordingly, the first vertical stem 193a and the second vertical stem 193b of the second pixel PXB, which include a plurality of vertical branch portions separated by the openings, are wider than the first vertical stem 193a and the second vertical stem 193b of the first pixel PXA. The first vertical branch portion 193a1 of the plurality of first vertical branch portions 193a1, 193a2, and 193a3 of the first vertical stem 193a and the second vertical branch portion 193b1 of the plurality of second vertical branch portions 193b1, 193b2, and 193b3 of the second vertical stem 193b are disposed overlapping the vertical portions 72a and 72b of the sub-pixel electrode 191a and 191b of the division voltage reference voltage line 172, and the rest of the plurality of vertical branch portions are all disposed on one side with reference to the vertical portion 72a and 72b of the division voltage reference voltage line 172.

Next, the representative shape 199 of the first and second sub-pixel electrode of the third pixel PXC of the liquid crystal display according to the exemplary embodiments will be described with reference to FIG. 7.

Referring to FIG. 7, the entire shape of the representative shape 199 of the second pixel PXB is a quadrangle, and includes the cross-shaped stem including the horizontal stem 192 and the vertical stem 193 crossing the horizontal stem 192. The horizontal stem 192 corresponds with the first horizontal stem 192a and the second horizontal stem 192b of the third pixel PXC, and the vertical stem 193 corresponds with the first vertical stem 193a and the second vertical stem 193b of the third pixel PXC. Further, the representative shape 199 is divided into a first subregion Da, a second subregion Db, a third subregion Dc, a fourth subregion Dd, and a fifth region De by the horizontal stem 192 and the vertical stem 193, and the subregions Da, Db, Dc, and each Dd includes the first minute branches 194a1, the second minute branches 194b1, the third minute branches 194c1, and the fourth minute branches 194*d*1, respectively. The fifth region De includes vertical branch portions 1931, 1932, and 1933. The vertical branch portions 1931, 1932, and 1933 respectively corresponds with the plurality of first vertical branch portions 193*a*1, 193*a*2, and 193*a*3 of the second vertical branch portions 193*b*1, 193*b*2, and 193*b*3, respectively.

Referring to FIG. 7 with reference to FIG. 5, the second width W2 of the vertical stem 193 of the second pixel PXB is larger than the first width W1 (FIG. 1) of the vertical stem 193 of the first pixel PXA. Also, the vertical stem 193 of the second pixel PXB includes a plurality of vertical branch portions 1931, 1932, and 1933 separated by the opening disposed along the length direction of the vertical stem 193 and extending parallel to each other. The portion of a plurality of vertical branch portions 1931, 1932, and 1933 of the vertical stem 193 of the third pixel PXC is disposed on one side with reference to a vertical center line V of the representative shape 199. Referring to FIG. 7, one vertical branch portion 1931 of the plurality of vertical branch portions 1931, 1932, and 1933 of the vertical stem 193 of the third pixel PXC overlaps the vertical center line V of the representative shape 199, and the rest of the vertical branch portions 1932 and 1933 of the vertical stem 193 are all disposed on the right side with reference to the vertical center line V of the representative shape 199.

The first minute branches 194*a*1 extend diagonally in an upper left direction from the horizontal stem 192 or the vertical stem 193, and the second minute branches 194*b*1 extend diagonally in an upper right direction from the horizontal stem 192 or the vertical stem 193. Further, the third minute branches 194*c*1 extend in a lower left direction from the horizontal stem 192 or the vertical stem 193, and the fourth minute branches 194*d*1 extend diagonally in a lower right direction from the horizontal stem 192 or the vertical stem 193.

The first to fourth minute branches 194*a*1, 194*b*1, 194*c*1, and 194*d*1 form an angle of approximately 45° or 135° with gate lines 121 or the horizontal stem 192. Further, the minute branches 194*a*1, 194*b*1, 194*c*1, and 194*d*1 of the adjacent subregions Da, Db, Dc, and Dd may be orthogonal to each other.

The pixel electrode 191 is applied with the data voltage, and in this case, the sides of the first to fourth fine branch portions 194*a*1, 194*b*1, 194*c*1, and 194*d*1 and the sides of the plurality of vertical branch portions 1931, 1932, and 1933 of the vertical stem 193 distort the electric field to generate the horizontal component determining the inclination direction of the liquid crystal molecules 31. The horizontal component of the electric field is substantially parallel to the sides of the first to fourth minute branches 194*a*1, 194*b*1, 194*c*1, and 194*d*1, and the sides of the plurality of vertical branch portions 1931, 1932, and 1933 of the vertical stem 193, and accordingly, the liquid crystal molecules 31 are inclined in the direction substantially perpendicular to the sides of the first to fourth minute branch portions 194*a*1, 194*b*1, 194*c*1, and 194*d*1 and the sides of a plurality of vertical branch portions 1931, 1932, and 1933 of the vertical stem 193 and collide with each other, thereby being inclined in the direction substantially parallel to the length direction of the minute branch portions 194*a*1, 194*b*1, 194*c*1, and 194*d*1 and the length direction of the vertical stem 193. Since one pixel electrode 191 of the second pixel PXB includes five subregions including four subregions Da, Db, Dc, and Dd in which the minute branches 194*a*1, 194*b*1, 194*c*1, and 194*d*1 extend in different directions from each other and the subregion De including the vertical stem 193, the liquid crystal molecules 31 includes five domains in which the liquid crystal molecules 31 of the liquid crystal layer 3 may be inclined in substantially four directions.

Particularly, in the fifth subregion De including the vertical stem 193, the inclination direction of the liquid crystal molecules 31 form the angle within substantially 45° with respect to the inclination direction of the liquid crystal molecules 31 in the first to fourth subregions Da, Db, Dc, Dd. The fifth subregion De is disposed biased to one side with reference to the vertical center line V of the representative shape 199, and as shown in FIG. 6, the fifth subregion De of the third pixel PXC is disposed on the right side with reference to the vertical center line V of the representative shape 199.

A method of aligning the liquid crystal molecules 31 to have a pretilt will be described with reference to FIG. 8.

Figure 8:
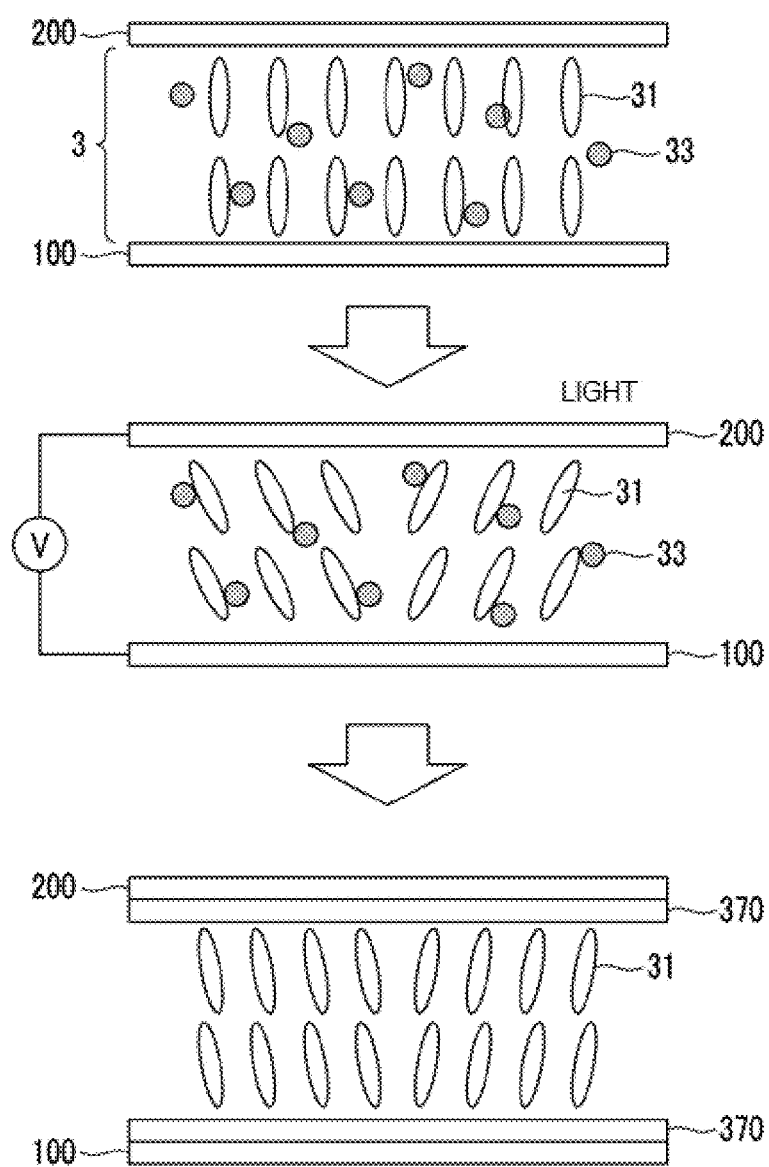
FIG. 8 is a view showing a process for providing a pretilt to liquid crystal molecules by using prepolymers that are polymerized by light such as ultraviolet rays, according to the exemplary embodiments.

FIG. 8 is a view illustrating a process of making liquid crystal molecules have a pre-tilt by using a prepolymer polymerized by light such as ultraviolet rays, according to the exemplary embodiments.

First, prepolymers 33 such as a monomer, which may be polymerized by light such as ultraviolet rays, are injected with a liquid crystal material between the lower and upper display panels 100 and 200. The prepolymers 33 may be a reactive mesogen which may be polymerized by light such as ultraviolet rays.

Next, a first subpixel electrode 191*a* and a second subpixel electrode 191*b* are applied with a data voltage and a common electrode 270 of the upper panel 200 is applied with a common voltage to generate an electric field to a liquid crystal layer 3 between the lower and upper display panels 100 and 200. Accordingly, the liquid crystal molecules 31 of the liquid crystal layer 3 are inclined in the direction according to each domain as described with reference to FIGS. 5, 6, and 7 in response to the electric field applied thereto.

After generating the electric field to the liquid crystal layer 3, the light such as ultraviolet rays is radiated, and the prepolymers 33 may be polymerized to form polymers 370, as shown in FIG. 8. The polymers 370 are formed contacting the lower and upper display panels 100 and 200. The alignment direction of the liquid crystal molecules 31 is determined according to the pretilt in the above described direction. Accordingly, the liquid crystal molecules 31 may be arranged with the pretilt of the four or five different directions even when the voltage is not applied to the pixel and common electrodes 191 and 270.

Figure 9:
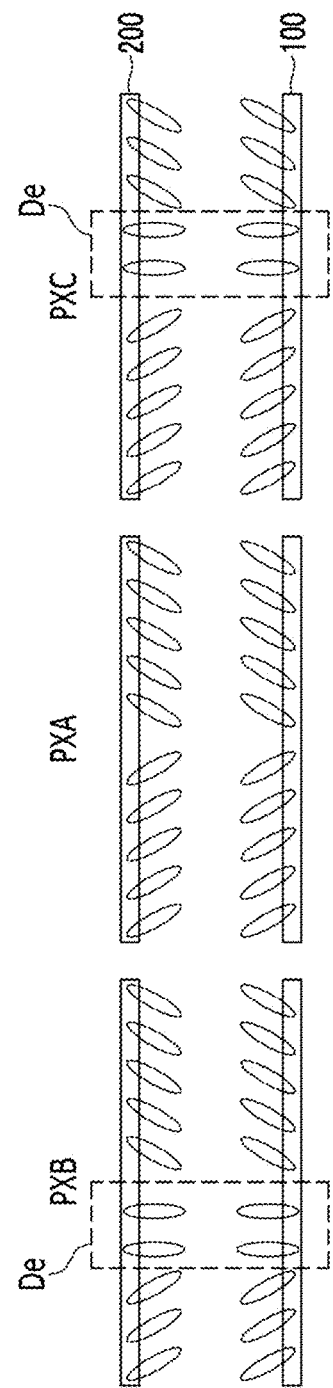
FIG. 9 is a conceptual view showing a movement of liquid crystal molecules of a liquid crystal display, according to one or more exemplary embodiments.
Figure 10A:
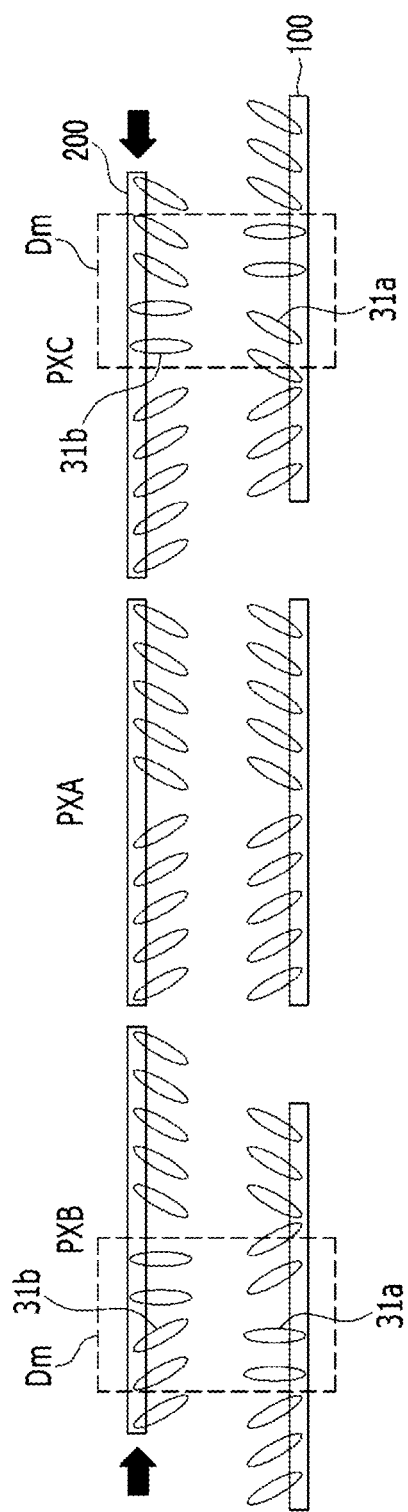

Next, a movement of the liquid crystal molecules of the liquid crystal display according to the exemplary embodiments will be described with reference to FIGS. 9, 10A, and 10B with FIGS. 5, 6, and 7. FIG. 9 is a conceptual view showing a movement of liquid crystal molecules of a liquid crystal display, according to the exemplary embodiments. FIG. 10A and FIG. 10B are conceptual views showing a movement of liquid crystal molecules of a liquid crystal display, according to an exemplary embodiments.

Referring to FIG. 9 with reference to FIGS. 5, 6, and 7, the liquid crystal display according to the exemplary embodiments includes a first pixel PXA, a second pixel PXB disposed at the left side of the first pixel PXA, and a third pixel PXC disposed at the right side of the first pixel PXA.

The liquid crystal molecules of the first pixel PXA are inclined in the different directions in the first subregion Da, the second subregion Db, the third subregion Dc, and the fourth subregion Dd.

The liquid crystal molecules of the second pixel PXB are inclined in the different directions in the first subregion Da, the second subregion Db, the third subregion Dc, and the fourth subregion Dd, and the liquid crystal molecules in the fifth region De are inclined in a direction at an angle within substantially 45° with respect to the inclination direction of the liquid crystal molecules in the first subregion Da, the second subregion Db, the third subregion Dc, and the fourth subregion Dd. The fifth subregion De of the second pixel PXB is disposed on the left side from the center line of the second pixel PXB.

The liquid crystal molecules of the third pixel PXC are inclined in the different directions in the first subregion Da, the second subregion Db, the third subregion Dc, and the fourth subregion Dd, and the liquid crystal molecules in the fifth region De are pretilted to form an angle within substantially 45° with respect to the liquid crystal molecules in the first subregion Da, the second subregion Db, the third subregion Dc, and the fourth subregion Dd. The fifth subregion De of the third pixel PXC is disposed on the right side from the center line of the second pixel PXB.

The movement of the liquid crystal molecules will be described with reference to FIG. 10A and FIG. 10B when an external force is applied to the liquid crystal display. Referring to FIG. 10A, when the external force is applied on both sides of the second display panel 200 compressing the liquid crystal display, the second pixel PXB and the third pixel PXC that are disposed at both sides with respect to the first pixel PXA are moved toward the first pixel PXA, thereby causing a misalignment region Dm in the second pixel PXB and the third pixel PXC.

In the misalignment region Dm, a first liquid crystal molecule 31a disposed adjacent to the lower display panel 100 and a second liquid crystal molecule 31b disposed adjacent to the upper display panel 200 are inclined in the different directions.

Accordingly, when the first liquid crystal molecule 31a disposed adjacent to the lower display panel 100 and the second liquid crystal molecule 31b disposed adjacent to the upper display panel 200 are inclined in the different directions, the alignment of the liquid crystal molecules is irregular, thereby causing decrease in the display quality in the misalignment region Dm.

According to a liquid crystal display according to the exemplary embodiments, in the misalignment region Dm, at least one of the first liquid crystal molecule 31a disposed adjacent to the lower display panel 100 and the second liquid crystal molecule 31b disposed adjacent to the upper display panel 200 is positioned in the fifth subregion De, and therefore the inclination direction of the first liquid crystal molecule 31a and the inclination direction of the second liquid crystal molecule 31b may form an angle of less than substantially 45° in the misalignment region Dm. Accordingly, the liquid crystal molecules disposed in the fifth subregion De may be inclined according to the inclination direction of the liquid crystal molecules disposed in the first to fourth subregions Da, Db, Dc, and Dd.

FIG. 10B is the top plan view showing each pixel area of FIG. 10A, referring to FIG. 10B, the liquid crystal molecules in the misalignment region Dm are inclined in the similar direction to the inclination direction of the liquid crystal molecules in the first to fourth subregions Da, Db, Dc, and Dd according to a vector sum of the inclination direction of the liquid crystal molecules in the fifth subregion De and the inclination direction of the liquid crystal molecules in the first to fourth subregions Da, Db, Dc, and Dd.

Compared to the liquid crystal display according to the exemplary embodiments, if the fifth subregion De is not disposed in the misalignment region Dm, the inclination direction of the first liquid crystal molecule 31a disposed adjacent to the side of the lower display panel 100 and the inclination direction of the second liquid crystal molecule 31b disposed adjacent to the side of the upper display panel 200 in the misalignment region Dm form substantially a 90 angle, and accordingly, it is difficult to incline the first liquid crystal molecule 31a and the second liquid crystal molecule 31b in the same direction in the misalignment region Dm.

According to the liquid crystal display according to the exemplary embodiments, when the external force is applied to the liquid crystal display generating the misalignment between the lower display panel 100 and the upper display panel 200, the liquid crystal molecules in the misalignment region Dm, in which the misalignment occurs, may be inclined in the similar direction according to the inclination direction of the liquid crystal molecules in each domain not included in the misalignment region Dm. Accordingly, although the two lower and upper substrates of the liquid crystal display are misaligned, the display quality deterioration of the liquid crystal display may be reduced or prevented.

Next, the liquid crystal display and the pixel arrangement according to the exemplary embodiments will be described with reference to FIG. 11.

Figure 11:
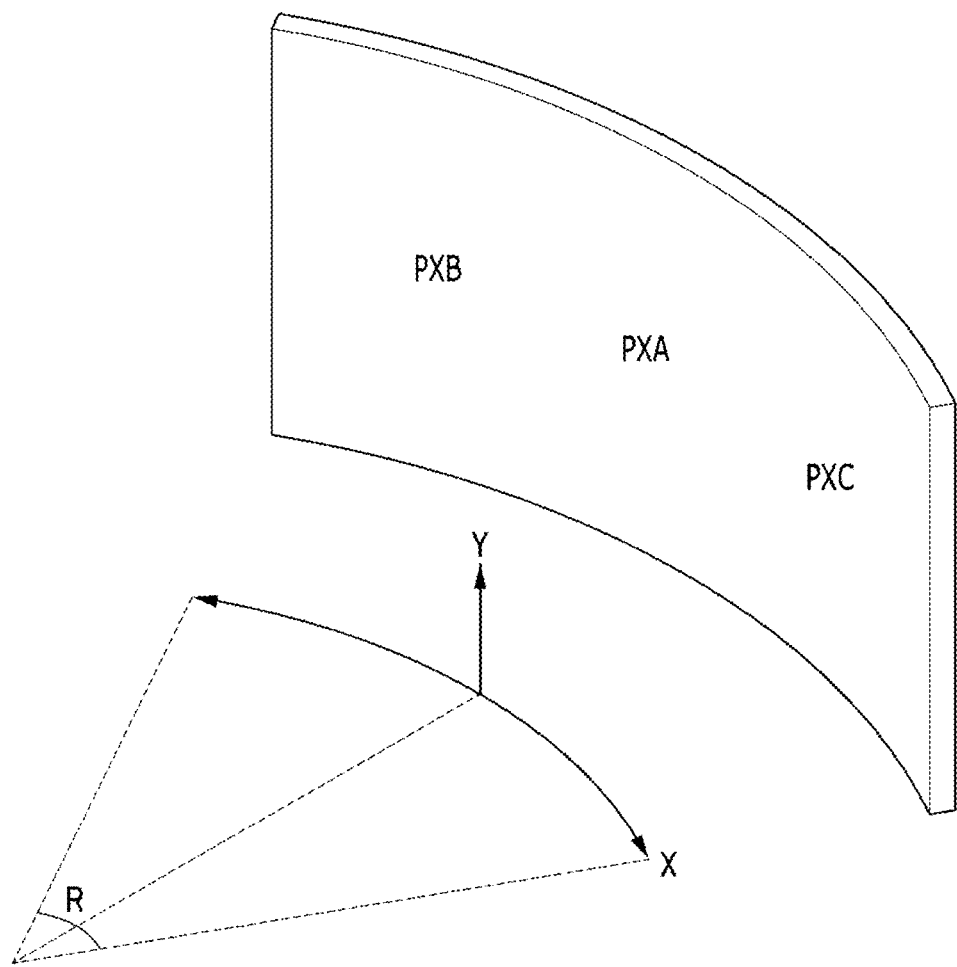
FIG. 11 is a conceptual view of a liquid crystal display and a pixel arrangement according to one or more exemplary embodiments.

FIG. 11 is a conceptual view of a liquid crystal display and a pixel arrangement according to the exemplary embodiments.

Referring to FIG. 11, the liquid crystal display according to the exemplary embodiments is curved to have a curvature R in the first direction X, including the first pixel PXA disposed at the center portion of the liquid crystal display in the first direction X, the second pixel PXB disposed on the left side of the first pixel PXA in the first direction X, and the third pixel PXC disposed on the right side of the first pixel PXA in the first direction X. As described above, the second pixel PXB includes the fifth subregion De in which the first openings H1 are formed along the length direction of the vertical stem 193 in the vertical stem 193 disposed on the left side with reference to the vertical center line V of the representative shape 199, and the third pixel PXC includes the fifth subregion De in which the second openings H2 are formed along the length direction of the vertical stem 193 in the vertical stem 193 disposed on the right side with reference to the vertical center line V of the representative shape 199.

Accordingly, as shown in FIG. 11, in the case of forming the liquid crystal display in the bent shape to have the curvature by the external force, the misalignment may be generated between the lower display panel 100 and the upper display panel 200 in the misalignment region Dm, and the liquid crystal molecules may be inclined together in the similar direction with reference to the inclination direction of the liquid crystal molecules in each domain. Accordingly, although the misalignment of two substrates of the liquid crystal display may be generated, the display quality deterioration of the liquid crystal display may be reduced or prevented.

Next, the liquid crystal display according to on or more exemplary embodiments will be described with reference to FIGS. 12, 13, 14, 15, 16, and 17 with reference to FIGS. 1, 2, 3, 4, 5, 6, and 7.

Figure 12:
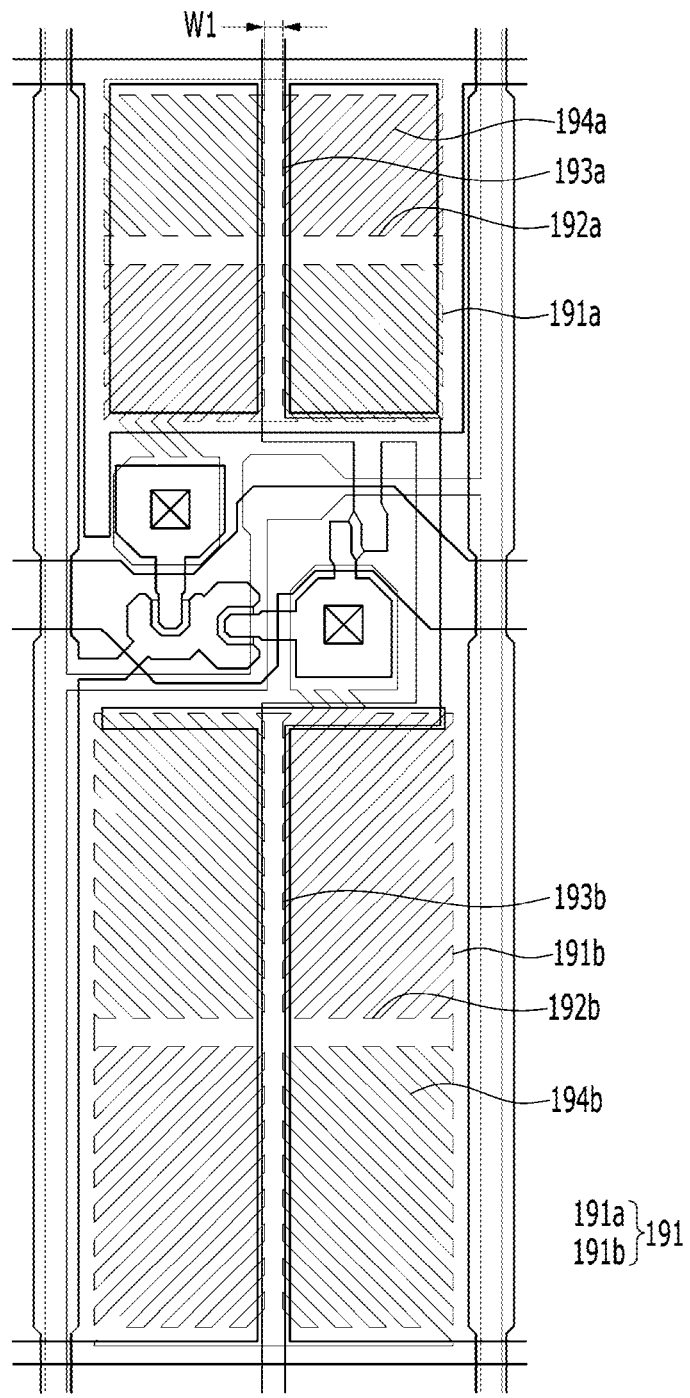
FIG. 12 is a plan view illustrating a layout of a first pixel of a liquid crystal display according to one or more exemplary embodiments.
Figure 13:
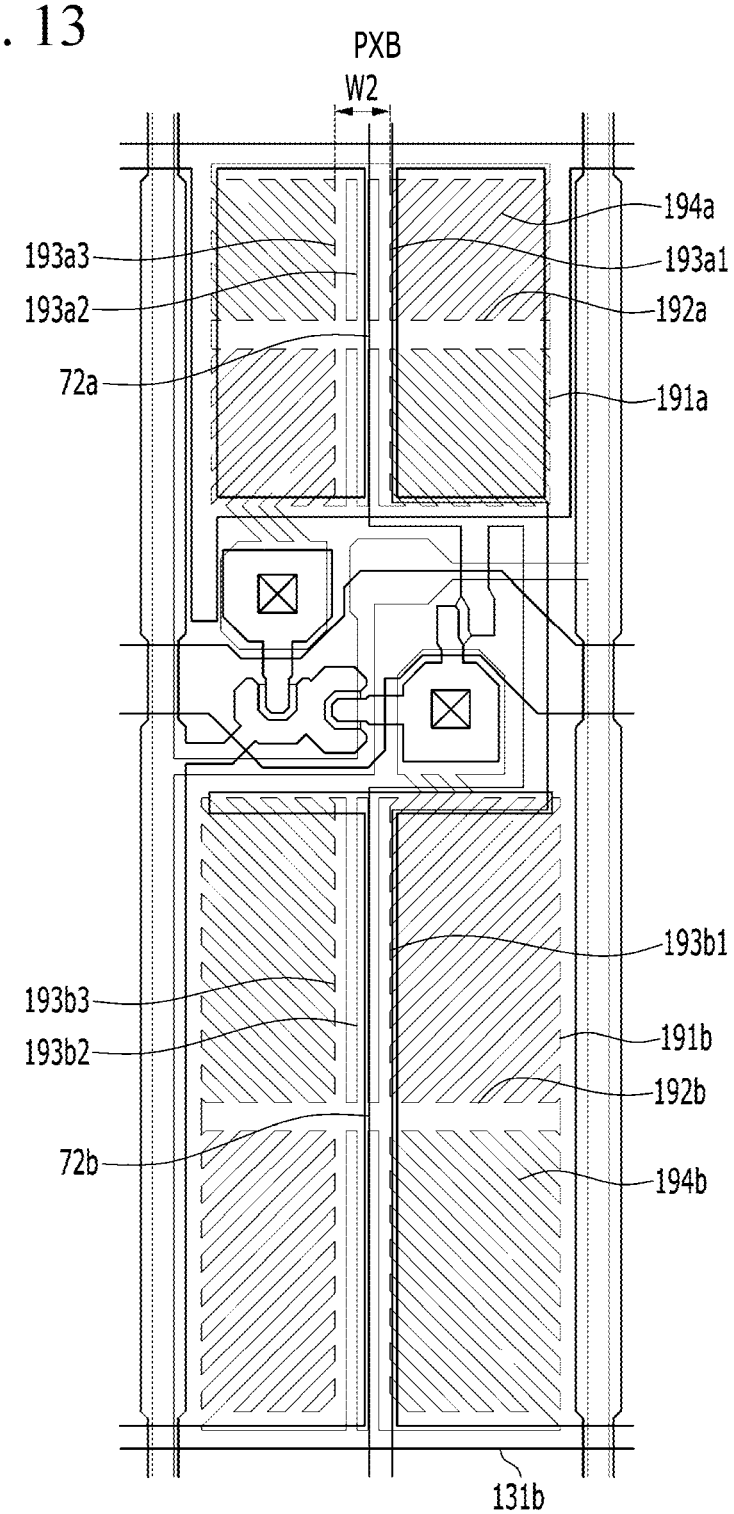
FIG. 13 is a plan view illustrating a layout of a second pixel of a liquid crystal display, according to one or more exemplary embodiments.
Figure 14:
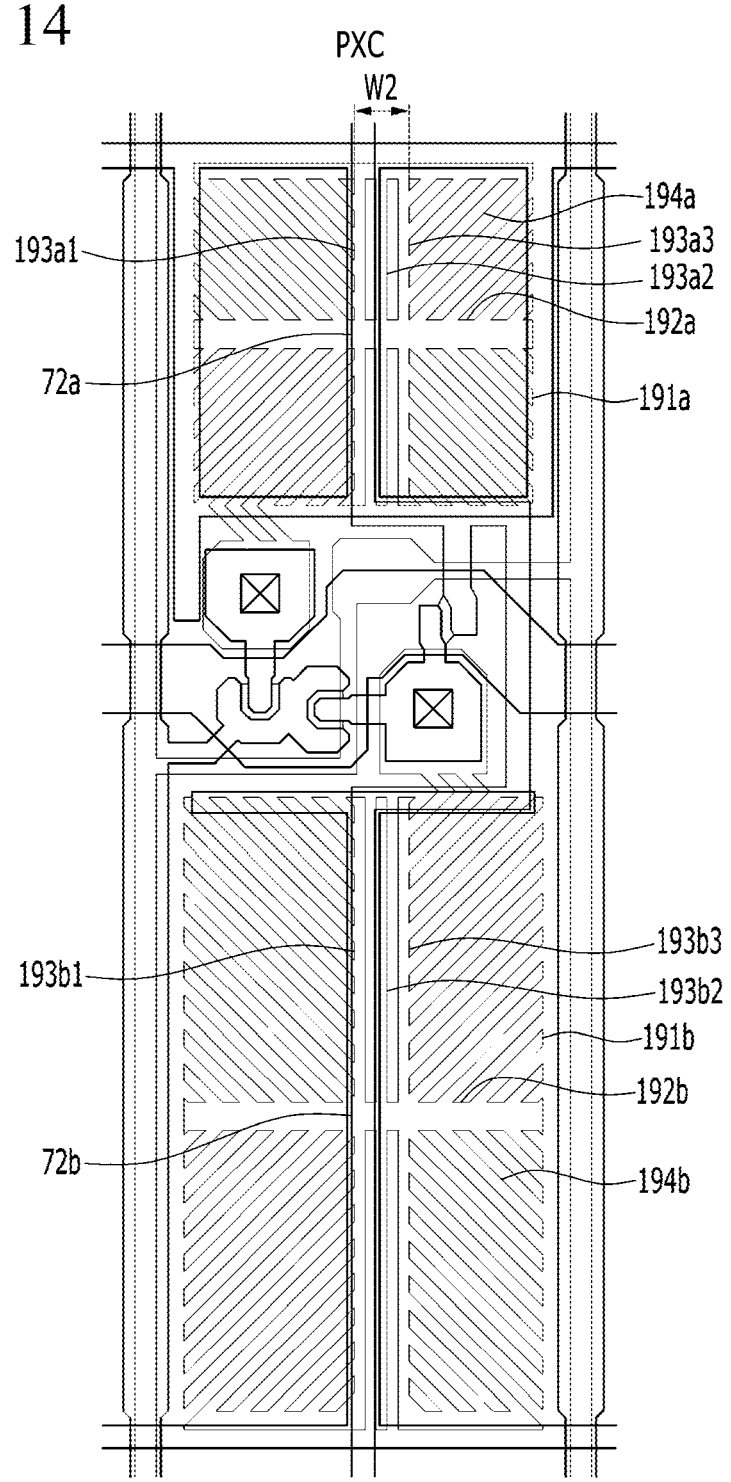
FIG. 14 is a plan view illustrating a layout of a third pixel of a liquid crystal display, according to one or more exemplary embodiments.
Figure 15:
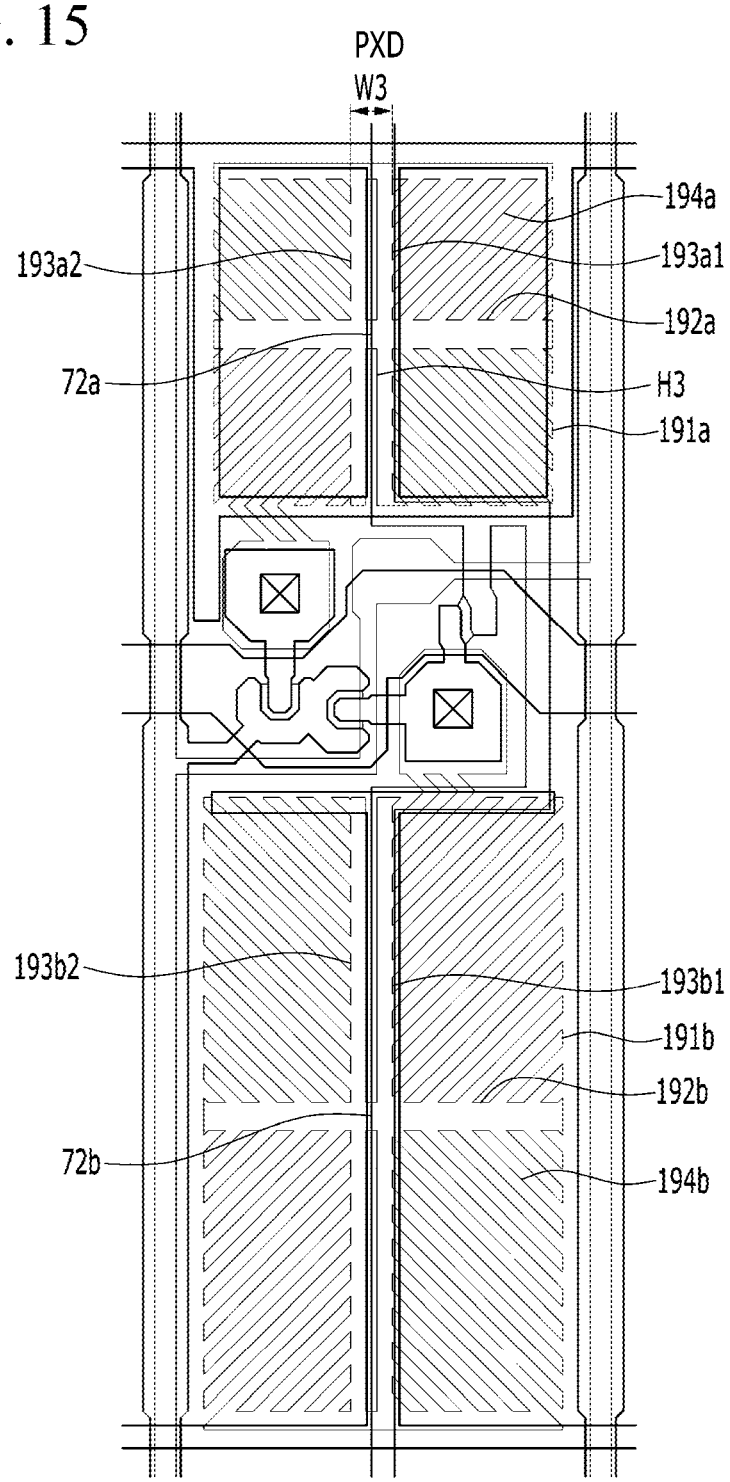
FIG. 15 is a plan view illustrating a layout of a fourth pixel of a liquid crystal display, according to one or more exemplary embodiments.
Figure 16:
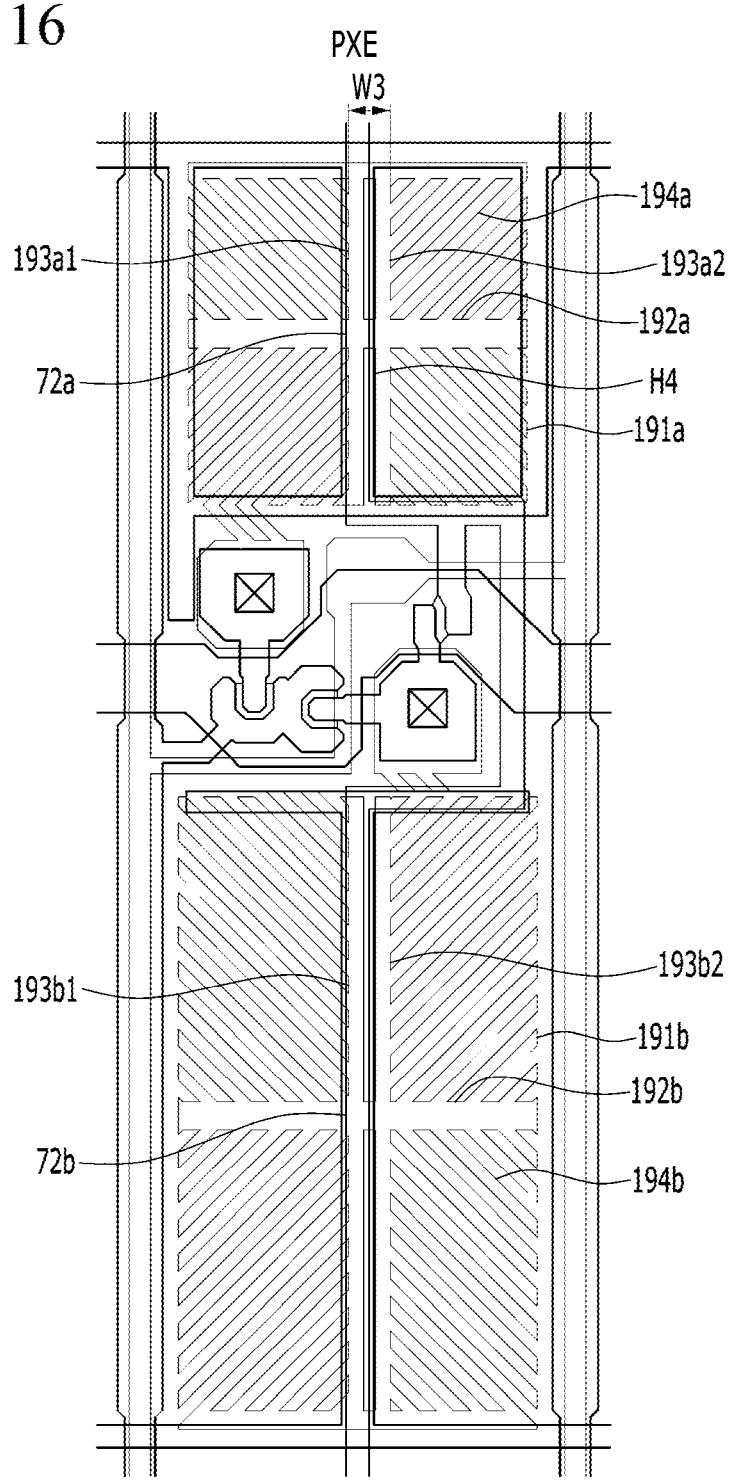
FIG. 16 is a plan view illustrating a layout of a fifth pixel of a liquid crystal display, according to one or more exemplary embodiments.
Figure 17:
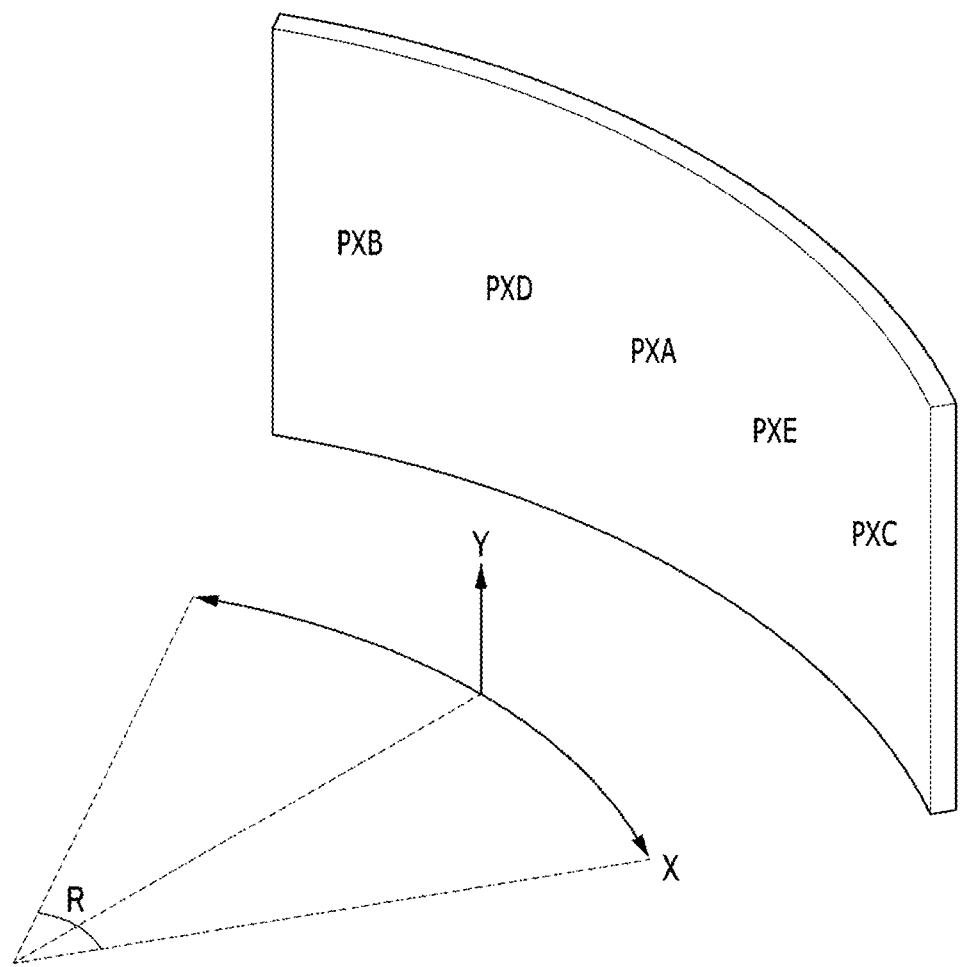
FIG. 17 is a conceptual view of a liquid crystal display and a pixel arrangement, according to one or more exemplary embodiments.

FIG. 12 is a plan view illustrating a layout of a first pixel of a liquid crystal display according to the exemplary embodiments, FIG. 13 is a plan view illustrating a layout of a second pixel of a liquid crystal display according to the exemplary embodiments, FIG. 14 is a plan view illustrating a layout of a third pixel of a liquid crystal display according to the exemplary embodiments, FIG. 15 is a plan view illustrating a layout of a fourth pixel of a liquid crystal display according to the exemplary embodiments, FIG. 16 is a plan view illustrating a layout of a fifth pixel of a liquid crystal display according to the exemplary embodiments, and FIG. 17 is a conceptual view of a liquid crystal display and a pixel arrangement according to the exemplary embodiments.

The structure of the liquid crystal display according to the present exemplary embodiments is substantially similar to the liquid crystal display according to the exemplary embodiments illustrated with reference to FIGS. 1, 2, 3, 4, 5, 6, and 7. Accordingly, the detailed description of similar structure may be omitted.

Referring to FIG. 12, the first pixel PXA of the liquid crystal display according to the present exemplary embodiments is the same as the first pixel PXA described with reference to FIG. 1 and FIG. 5.

The entire shape of the first sub-pixel electrode 191*a* of the pixel electrode 191 of the first pixel PXA is a quadrangle, and includes a cross-shaped stem including the first horizontal stem 192*a* and the first vertical stem 193*a* and a plurality of branch electrodes 194*a* extending from the cross-shaped stem.

The entire shape of the second sub-pixel electrode 191*b* of the pixel electrode 191 of the first pixel PXA is a quadrangle, and includes the cross-shaped stem including the second horizontal stem 192*b* and the second vertical stem 193*b* and a plurality of branch electrodes 194*b* extending from the cross-shaped stem.

Referring to FIG. 13, the second pixel PXB of the liquid crystal display according to the present exemplary embodiments is substantially same as the second pixel PXB described with reference to FIG. 2 and FIG. 6.

The entire shape of the first sub-pixel electrode 191*a* of the pixel electrode 191 of the second pixel PXB is a quadrangle, and includes the cross-shaped stem including the first horizontal stem 192*a* and the first vertical stem 193*a* and the plurality of branch electrodes 194*a* extending from the cross-shaped stem.

The entire shape of the second sub-pixel electrode 191*b* of the pixel electrode 191 of the second pixel PXB is a quadrangle, and includes the cross-shaped stem including the second horizontal stem 192*b* and the second vertical stem 193*b* and the plurality of branch electrodes 194*b* extending from the cross-shaped stem.

The first vertical stem 193*a* of the first sub-pixel electrode 191*a* of the second pixel PXB includes a plurality of first vertical branch portions 193*a*1, 193*a*2, and 193*a*3 spaced apart by first openings H1 disposed along the length direction of the first vertical stem 193*a* and extending parallel to each other.

The second vertical stem 193*b* of the second sub-pixel electrode 191*b* of the second pixel PXB includes a plurality of second vertical branch portions 193*b*1, 193*b*2, and 193*b*3 spaced apart by the first openings H1 disposed along the length direction of the second vertical stem 193*b* and extending parallel to each other.

The second width W2 of the first vertical stem 193*a* and the second vertical stem 193*b* of the second pixel PXB is larger than the first width W1 of the first vertical stem 193*a* and the second vertical stem 193*b* of the first sub-pixel electrode 191*a* of the first pixel PXA.

The first vertical branch portion 193*a*1 of the first vertical stem 193*a* of the first sub-pixel electrode 191*a* of the second pixel PXB overlaps the first vertical portion 72*a* of the division voltage reference voltage line 172, and the rest of the branch portions 193*a*2 and 193*a*3 of the first vertical stem 193*a* are disposed on one side with reference to the first vertical portion 72*a* of the division voltage reference voltage line 172. Referring to FIG. 13, the rest of the branch portions 193*a*2 and 193*a*3 of the first vertical stem 193*a* are disposed on the left side with reference to the first vertical portion 72*a* of the division voltage reference voltage line 172.

The second vertical branch portion 193*b*1 of the second vertical stem 193*b* of the second sub-pixel electrode 191*b* of the second pixel PXB overlaps the second vertical portion 72*b* of the division voltage reference voltage line 172, and the rest of the branch portions 193*b*2 and 193*b*3 of the second vertical stem 193*b* are disposed on one side with reference to the second vertical portion 72*b* of the division voltage reference voltage line 172. Referring to FIG. 13, the rest of the branch portions 193*b*2 and 193*b*3 of the second vertical stem 193*b* are disposed on the left side with reference to the second vertical portion 72*b* of the division voltage reference voltage line 172.

Accordingly, the first vertical stem 193*a* and the second vertical stem 193*b* of the second pixel PXB respectively include a plurality of vertical branch portions separated by the first and second openings H1 and H2, and are wider than the first vertical stem 193*a* and the second vertical stem 193*b* of the first pixel PXA, the first vertical branch portion 193*a*1 and the second vertical branch portion 193*b*1 of the first vertical stem 193*a* and the second vertical stem 193*b* are disposed in the vertical center portion of the sub-pixel electrodes 191*a* and 191*b* to overlap the first and second vertical portions 72*a* and 72*b* of the division voltage reference voltage line 172, and the rest of the vertical branch portions are disposed on one side with reference to the first and second vertical portions 72*a* and 72*b* of the division voltage reference voltage line 172 disposed at the vertical center portion of the first and second sub-pixel electrodes 191*a* and 191*b*.

Referring to FIG. 14, the third pixel PXC of the liquid crystal display of the present exemplary embodiments is substantially same as the third pixel PXC described with reference to FIG. 3 and FIG. 7.

The entire shape of the first sub-pixel electrode 191*a* of the pixel electrode 191 of the third pixel PXC is a quadrangle, and includes the cross-shaped stem including the first horizontal stem 192*a* and the first vertical stem 193*a* and the plurality of branch electrodes 194*a* extending from the cross-shaped stem.

The entire shape of the second sub-pixel electrode 191*b* of the pixel electrode 191 of the third pixel PXC is a quadrangle, and includes the cross-shaped stem including the second horizontal stem 192*b* and the second vertical stem 193*b* and the plurality of branch electrodes 194*b* extending from the cross-shaped stem.

The first vertical stem 193*a* of the first sub-pixel electrode 191*a* of the third pixel PXC includes a plurality of first vertical branch portions 193*a*1, 193*a*2, and 193*a*3 spaced apart by second openings H2 disposed along the length direction of the first vertical stem 193*a* and extending parallel to each other.

The second vertical stem 193*b* of the second sub-pixel electrode 191*b* of the third pixel PXC includes a plurality of second vertical branch portions 193*b*1, 193*b*2, and 193*b*3 spaced apart by the second openings H2 disposed along the length direction of the second vertical stem 193*b* and extending parallel to each other.

The second width W2 of the first vertical stem 193*a* and the second vertical stem 193*b* of the first sub-pixel electrode 191a of the third pixel PXC is larger than the first width W1 of the first vertical stem 193a and the second vertical stem 193b of the first pixel PXA.

The first vertical branch portion 193a1 of the first vertical stem 193a of the first sub-pixel electrode 191a of the third pixel PXC overlaps the first vertical portion 72a of the division voltage reference voltage line 172, and the rest of the branch portions 193a2 and 193a3 of the first vertical stem 193a are disposed on one side with reference to the first vertical portion 72a of the division voltage reference voltage line 172. Referring to FIG. 14, the rest of the branch portions 193a2 and 193a3 of the first vertical stem 193a are disposed on the right side with reference to the first vertical portion 72a of the division voltage reference voltage line 172.

The second vertical branch portion 193b1 of the second vertical stem 193b of the second sub-pixel electrode 191b of the third pixel PXC overlaps the second vertical portion 72b of the division voltage reference voltage line 172, and the rest of the branch portions 193b2 and 193b3 of the second vertical stem 193b are disposed on one side with reference to the second vertical portion 72b of the division voltage reference voltage line 172. Referring to FIG. 14, the rest of the branch portions 193b2 and 193b3 of the second vertical stem 193b are disposed on the right side with reference to the second vertical portion 72b of the division voltage reference voltage line 172.

Accordingly, the first vertical stem 193a and the second vertical stem 193b of the second pixel PXB respectively include a plurality of vertical branch portions separated by the first and second openings H1 and H2, and are wider than the first vertical stem 193a and the second vertical stem 193b of the first pixel PXA, the first vertical branch portion 193a1 and the second vertical branch portion 193b1 of the first vertical stem 193a and the second vertical stem 193b are disposed in the vertical center portions of the sub-pixel electrodes 191a and 191b to overlap the first and second vertical portions 72a and 72b of the division voltage reference voltage line 172, and the rest of the vertical branch portions are disposed on one side with reference to the vertical portion 72a and 72b of the division voltage reference voltage line 172.

The liquid crystal display according to the exemplary embodiments further includes a fourth pixel PXD disposed between the first pixel PXA and the second pixel PXB and a fifth pixel PXE disposed between the first pixel PXA and the third pixel PXC.

The fourth pixel PXD will be described with reference to FIG. 15. Referring to FIG. 15, the entire shape of the first sub-pixel electrode 191a of the pixel electrode 191 of the fourth pixel PXD of the liquid crystal display according to the present exemplary embodiments is a quadrangle, and includes the cross-shaped stem including the first horizontal stem 192a and the first vertical stem 193a and the plurality of branch electrodes 194a extending from the cross-shaped stem.

The entire shape of the second sub-pixel electrode 191b of the pixel electrode 191 of the fourth pixel PXD is a quadrangle, and includes the cross-shaped stem including the second horizontal stem 192b and the second vertical stem 193b and the plurality of branch electrodes 194b extending from the cross-shaped stem.

The first vertical stem 193a of the first sub-pixel electrode 191a of the fourth pixel PXD includes a plurality of first vertical branch portions 193a1 and 193a2 spaced apart by a third opening H3 disposed along the length direction of the first vertical stem 193a and extending parallel to each other.

The second vertical stem 193b of the second sub-pixel electrode 191b of the fourth pixel PXD includes a plurality of second vertical branch portions 193b1 and 193b2 spaced apart by the third openings H3 disposed along the length direction of the second vertical stem 193b and extending parallel to each other.

A number of the plurality of vertical branch portions of the first vertical stem 193a and the second vertical stem 193b included in the first sub-pixel electrode 191a of the fourth pixel PXD is smaller than the number of the plurality of vertical branch portions included in the first vertical stem 193a and the second vertical stem 193b of the second pixel PXB.

The third width W3 of the first vertical stem 193a and the second vertical stem 193b of the first sub-pixel electrode 191a of the fourth pixel PXD, is larger than the first width W1 of the first vertical stem 193a and the second vertical stem 193b of the first pixel PXA, and is smaller than the second width W2 of the first vertical stem 193a and the second vertical stem 193b of the second pixel PXB.

The first vertical branch portion 193a1 of the first vertical stem 193a of the first sub-pixel electrode 191a of the fourth pixel PXD overlaps the first vertical portion 72a of the division voltage reference voltage line 172, and the branch portion 193a2 of the first vertical stem 193a is disposed on the left side with reference to the first vertical portion 72a of the division voltage reference voltage line 172.

The second vertical branch portion 193b1 of the second vertical stem 193b of the second sub-pixel electrode 191b of the fourth pixel PXD overlaps the second vertical portion 72b of the division voltage reference voltage line 172, and the vertical branch portion 193b2 of the second vertical stem 193b is disposed on the left side with reference to the second vertical portion 72b of the division voltage reference voltage line 172.

Accordingly, the first vertical stem 193a and the second vertical stem 193b of the fourth pixel PXD, respectively include the plurality of vertical branch portions spaced apart by the third openings H3, are wider than the first vertical stem 193a and the second vertical stem 193b of the first pixel PXA, and are narrower than the first vertical stem 193a and the second vertical stem 193b of the second pixel PXB. The vertical branch portion of the first vertical stem 193a and the second vertical stem 193b are disposed in the vertical center portions of the sub-pixel electrode 191a and 191b to overlap the vertical portions 72a and 72b of the division voltage reference voltage line 172, and the rest of the vertical branch portions are positioned in one direction with reference to the first and second vertical portions 72a and 72b of the division voltage reference voltage line 172 positioned in the vertical center portions of the sub-pixel electrodes 191a and 191b.

That is, the width of the first vertical stem 193a and the second vertical stem 193b of the pixels may be gradually increased as the pixel is disposed farther away with reference to the first pixel PXA, and the number of the vertical branch portions of the first vertical stem 193a and the second vertical stem 193b may also be increased.

Also, the vertical branch portions of the first vertical stem 193a and the second vertical stem 193b of the second pixel PXB and the fourth pixel PXD, which are disposed on the left side with reference to the first pixel PXA, are disposed on the left side with reference to the vertical center portions of the first and second sub-pixel electrodes 191a and 191b.

Next, the fifth pixel PXE will be described with reference to FIG. 16. Referring to FIG. 16, the entire shape of the first sub-pixel electrode 191a of the pixel electrode 191 of the fifth pixel PXE is a quadrangle, and includes the cross-shaped stem including the first horizontal stem 192a and the first vertical stem 193a and the plurality of branch electrodes 194a extending from the cross-shaped stem.

The entire shape of the second sub-pixel electrode 191b of the pixel electrode 191 of the fifth pixel PXE is a quadrangle, and includes the cross-shaped stem including the second horizontal stem 192b and the second vertical stem 193b and the plurality of branch electrodes 194b extending from the cross-shaped stem.

The first vertical stem 193a of the first sub-pixel electrode 191a of the fifth pixel PXE includes a plurality of first vertical branch portions 193a1 and 193a2 spaced apart by a fourth openings H4 disposed along the length direction of the first vertical stem 193a and extending parallel to each other.

The second vertical stem 193b of the second sub-pixel electrode 191b of the second pixel PXB includes a plurality of second vertical branch portions 193b1 and 193b2 spaced apart by the fourth openings H4 disposed along the length direction of the second vertical stem 193b and extending parallel to each other.

A number of the plurality of vertical branch portions of the first vertical stem 193a and the second vertical stem 193b included in the first sub-pixel electrode 191a of the fifth pixel PXE is smaller than the number of the plurality of vertical branch portions included in the first vertical stem 193a and the second vertical stem 193b of the third pixel PXC.

The third width W3 of the first vertical stem 193a and the second vertical stem 193b of the first sub-pixel electrode 191a of the fifth pixel PXE, is larger than the first width W1 of the first vertical stem 193a and the second vertical stem 193b of the first sub-pixel electrode 191a of the first pixel PXA, and is smaller than the second width W2 of the first vertical stem 193a and the second vertical stem 193b of the third pixel PXC.

The first vertical branch portion 193a1 of the first vertical stem 193a of the first sub-pixel electrode 191a of the fifth pixel PXE overlaps the first vertical portion 72a of the division voltage reference voltage line 172, and the vertical branch portion 193a2 of the first vertical stem 193a is disposed on the right side with reference to the first vertical portion 72a of the division voltage reference voltage line 172.

The second vertical branch portion 193b1 of the second vertical stem 193b of the second sub-pixel electrode 191b of the fifth pixel PXE overlaps the second vertical portion 72b of the division voltage reference voltage line 172, and the vertical branch portion 193b2 of the second vertical stem 193b is disposed on the right side with reference to the second vertical portion 72b of the division voltage reference voltage line 172.

Accordingly, the first vertical stem 193a and the second vertical stem 193b of the fifth pixel PXE respectively include the plurality of vertical branch portions spaced apart by the fourth openings H4, are wider than the first vertical stem 193a and the second vertical stem 193b of the first pixel PXA, and are narrower than the first vertical stem 193a and the second vertical stem 193b of the third pixel PXC. The vertical branch portions of the first vertical stem 193a and the second vertical stem 193b are disposed in the vertical center portions of the sub-pixel electrodes 191a and 191b to overlap the vertical portions 72a and 72b of the division voltage reference voltage line 172, and the rest of the vertical branch portions are positioned in one direction with reference to the first and second vertical portions 72a and 72b of the division voltage reference voltage line 172 positioned in the vertical center portion of the sub-pixel electrodes 191a and 191b.

That is, the width of the first vertical stem 193a and the second vertical stem 193b of the pixels may be gradually increased as the pixel is disposed farther away with reference to the first pixel PXA, and the number of the vertical branch portions of the first vertical stem 193a and the second vertical stem 193b may also be increased.

Also, the vertical branch portions of the first vertical stem 193a and the second vertical stem 193b of the third pixel PXC and the fifth pixel PXE, which are disposed on the right side with reference to the first pixel PXA, are disposed on the right side with reference to the vertical center portions of the first and second sub-pixel electrodes 191a and 191b.

The first pixel PXA of the liquid crystal display according to the present exemplary embodiments is disposed in the center portion of the liquid crystal display, the second pixel PXB and the fourth pixel PXD are disposed on the left side with reference to the first pixel PXA, and the third pixel PXC and the fifth pixel PXE are disposed on the right side with reference to the first pixel PXA. Also, as a pixel is disposed farther away with reference to the first pixel PXA, which is disposed in the center portion of the liquid crystal display, the width of the first vertical stem 193a and the second vertical stem 193b may be increased, and the number of the vertical branch portions of the first vertical stem 193a and the second vertical stem 193b may also be increased.

Further, the vertical branch portions of the first vertical stem 193a and the second vertical stem 193b are disposed on a side with reference to the vertical center portion of the sub-pixel electrode 191a and 191b that is substantially same with the side that the pixel is disposed with reference to the first pixel PXA. The vertical branch portions of the first vertical stem 193a and the second vertical stem 193b of the second pixel PXB and the fourth pixel PXD, which are disposed on the left side with reference to the first pixel PXA, are disposed on the left side with reference to the vertical center portion of the sub-pixel electrodes 191a and 191b. The vertical branch portions of the first vertical stem 193a and the second vertical stem 193b of the third pixel PXC and the fifth pixel PXE, which are disposed on the right side with reference to the first pixel PXA, are disposed on the right side with reference to the vertical center portion of the sub-pixel electrode 191a and 191b.

Accordingly, by disposing the plurality of longitudinal branch portions in the longitudinal stem of the pixel disposed on the right side and the left side with reference to the pixel positioned in the center portion of the pixel area, when the external force is applied to the liquid crystal display generating the misalignment between the lower display panel 100 and the upper display panel 200, the liquid crystal molecules that are disposed in the misalignment region where the misalignment is generated may be inclined in the direction parallel to the plurality of vertical branch portions and therefore, the liquid crystal molecules may be inclined together in a similar direction according to the inclination direction of the liquid crystal molecules in each domain in the misalignment region. Accordingly, even when the two substrates of the liquid crystal display is misaligned, the display quality deterioration of the liquid crystal display may be reduced or prevented.

Next, the liquid crystal display and the pixel arrangement according to the exemplary embodiments will be described with reference to FIG. 17.

Referring to FIG. 17, the liquid crystal display according to the exemplary embodiments is curved to have a curvature R in the first direction X, including the first pixel PXA disposed at the center portion of the liquid crystal display in the first direction X, the second pixel PXB and the fourth pixel PXD disposed on the left side of the first pixel PXA, and the third pixel PXC and the fifth pixel PXE disposed on the right side of the first pixel PXA. As described above, the second pixel PXB and the fourth pixel PXD respectively include the regions where the plurality of vertical branch portions are disposed by the first and third openings H1 and H3 formed along the length direction of the vertical stem 193 in the vertical stem 193 disposed on the left side with reference to the vertical center portion of the pixel electrode 191, and the third pixel PXC and the fifth pixel PXE respectively include the regions where the plurality of vertical branch portions are disposed by the second and fourth openings H2 and H4 formed along the length direction of the vertical stem 193 in the vertical stem 193 disposed on the right side with reference to the vertical center portion of the pixel electrode 191. Also, as the pixel is disposed farther away with reference to the first pixel PXA, which is disposed in the center portion of the liquid crystal display, the width of the first vertical stem 193a and the second vertical stem 193b may be increased, and the number of the vertical branch portions of the first vertical stem 193a and the second vertical stem 193b may be increased. Accordingly, by controlling the number of the vertical branch portions and the width of the vertical stem according to the position of the pixel, the vertical branch portion of the vertical stem may be disposed in the misalignment region according to the misalignment between the lower display panel 100 and the upper display panel 200.

Therefore, although different misalignments may be generated by the external force applied to the liquid crystal display, by positioning the liquid crystal molecules that are inclined in the direction parallel to the plurality of vertical branch portions in the misalignment region where the misalignment is generated, the liquid crystal molecules may be inclined in a similar direction with reference to the inclination direction of the liquid crystal molecules in each domain in the misalignment region. Accordingly, even when the misalignment of the two substrates of the liquid crystal display is generated, the display quality deterioration of the liquid crystal display may be reduced or prevented.

Next, exemplary experiment results will be described with reference to FIGS. 18A, 18B, 19A, and 19B. FIGS. 18A, 18B, 19A, and 19B are exemplary experiment results showing a transmittance of one pixel of the exemplary embodiments.

In the exemplary experiment, a first exemplary pixel is a conventional design in which the vertical branch portion of the vertical stem is not disposed in the region where the misalignment is generated, and a second exemplary pixel is according to the exemplary embodiments in which the vertical branch portion of the vertical stem is disposed in the region where the misalignment is generated. The transmittance of the pixels are measured in a first state S1 in which the external force is not applied to the pixels, and in a second state S2 in which the external force is applied to the pixel by providing curvature to the display.

Figure 18:
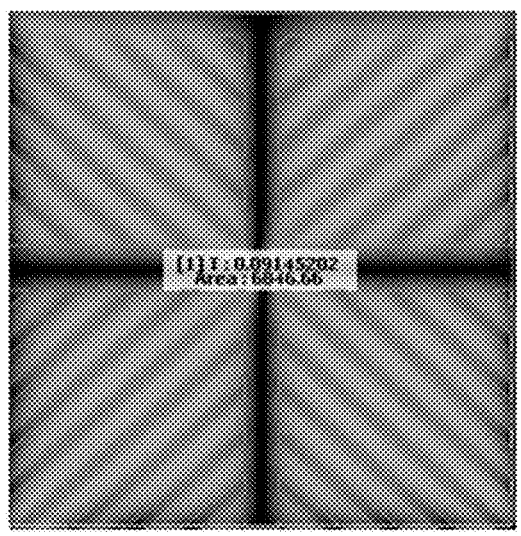
FIGS. 18A, 18B, 19A, and 19B are exemplary experimental results of the exemplary experiments.
Figure 18:
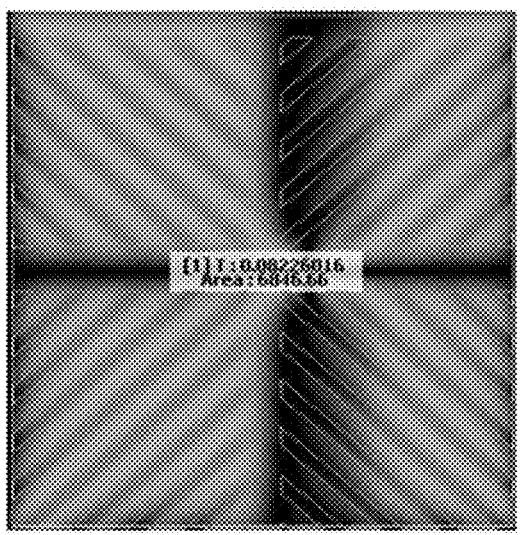
Figure 19:
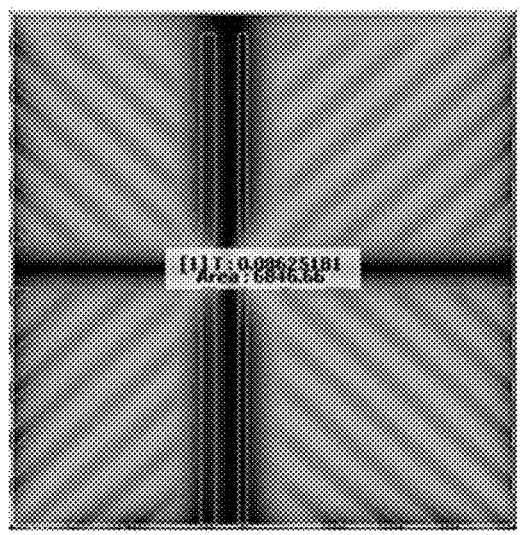
Figure 19:
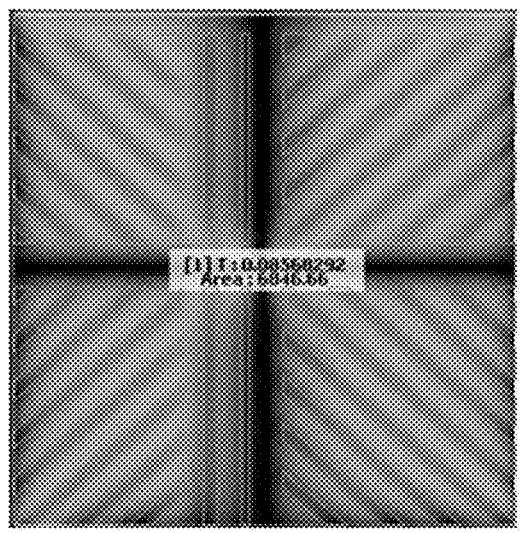

FIGS. 18A and 18B show the results of the first exemplary pixel, where 18A shows the transmittance of the first state S1 and 18B illustrates the transmittance of the second state S2. FIGS. 19A and 19B shows the results of the second exemplary pixel, where 19A shows the transmittance of the first state S1 and 19B illustrates the transmittance of the second state S2.

Referring to FIGS. 18A and 18B, when compared to the transmittance result of the first exemplary pixel in the first state S1 in which the external force is not applied to the first exemplary pixel as shown in FIG. 18A, FIG. 18B shows that the first exemplary pixel in the second state S2 may have deterioration of the transmittance in one side with reference to the vertical stem when the external force is applied to the first exemplary pixel.

Referring to FIGS. 19A and 19B, when compared to the transmittance result of the second exemplary pixel in the first state S1 in which the external force is not applied to the second exemplary pixel as shown in FIG. 19A, FIG. 19B shows that the second exemplary pixel in the second state S2 may have reduced or no deterioration of the transmittance when the external force is applied to the first exemplary pixel.

According to the liquid crystal display according to the exemplary embodiments, by forming the vertical branch portion of the vertical stem in the region where the misalignment is generated, the display quality deterioration of the liquid crystal display may be reduced or prevented even when two substrates of the liquid crystal display are misaligned.

Figure 20:
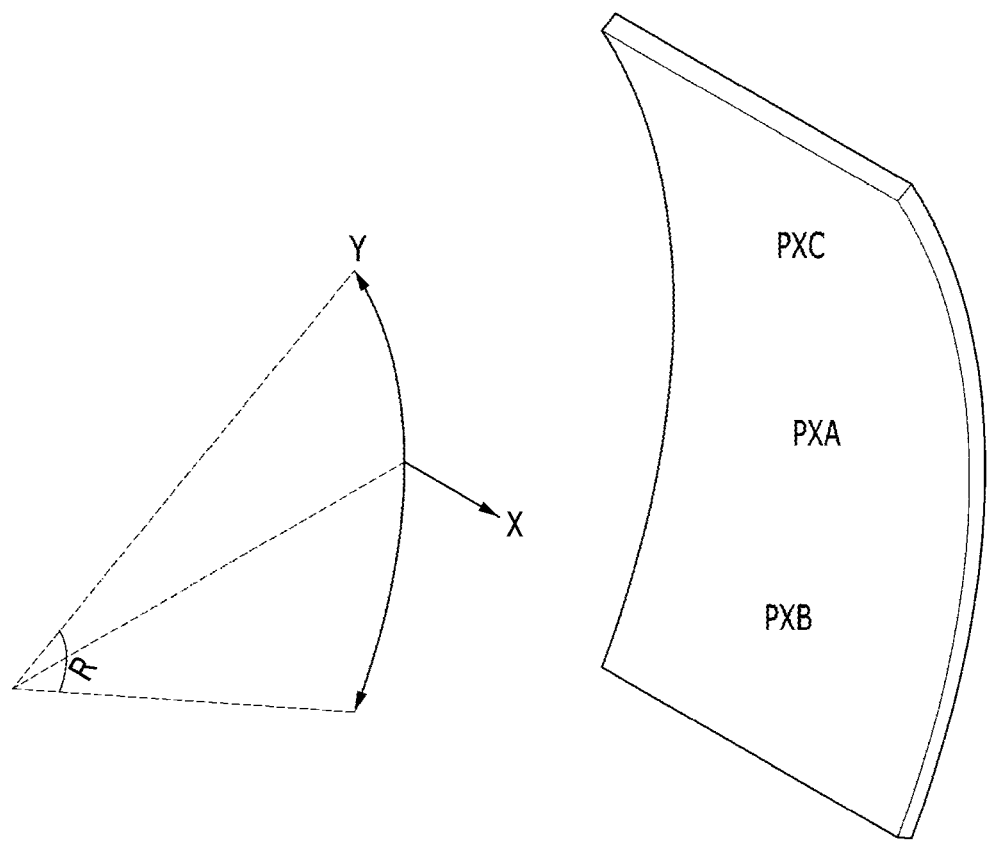
FIG. 20 is a conceptual view of a liquid crystal display and a pixel arrangement, according to one or more exemplary embodiments.
Figure 21:
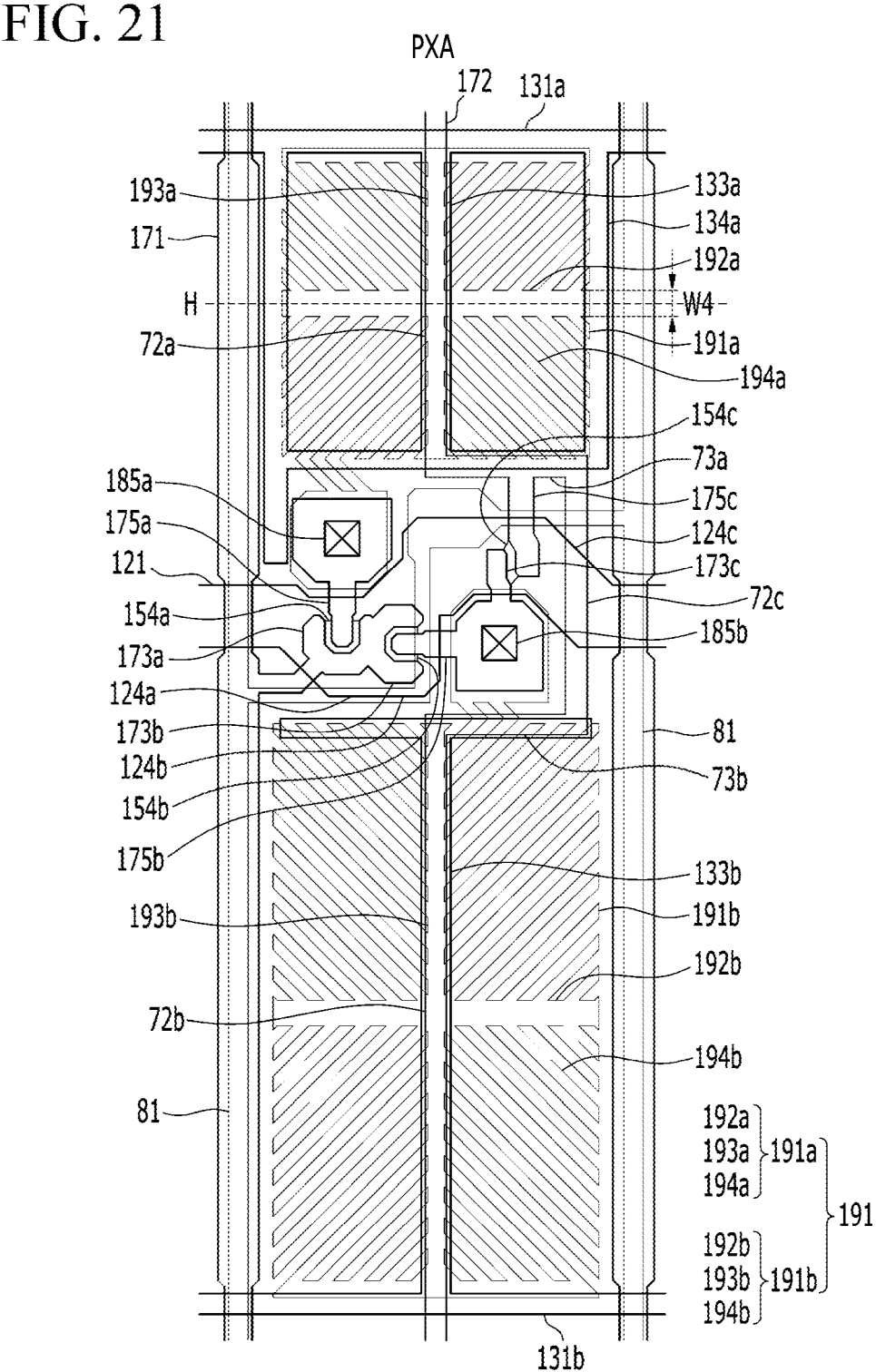
FIG. 21 is a plan view illustrating a layout of a first pixel of a liquid crystal display, according to one or more exemplary embodiments.
Figure 22:
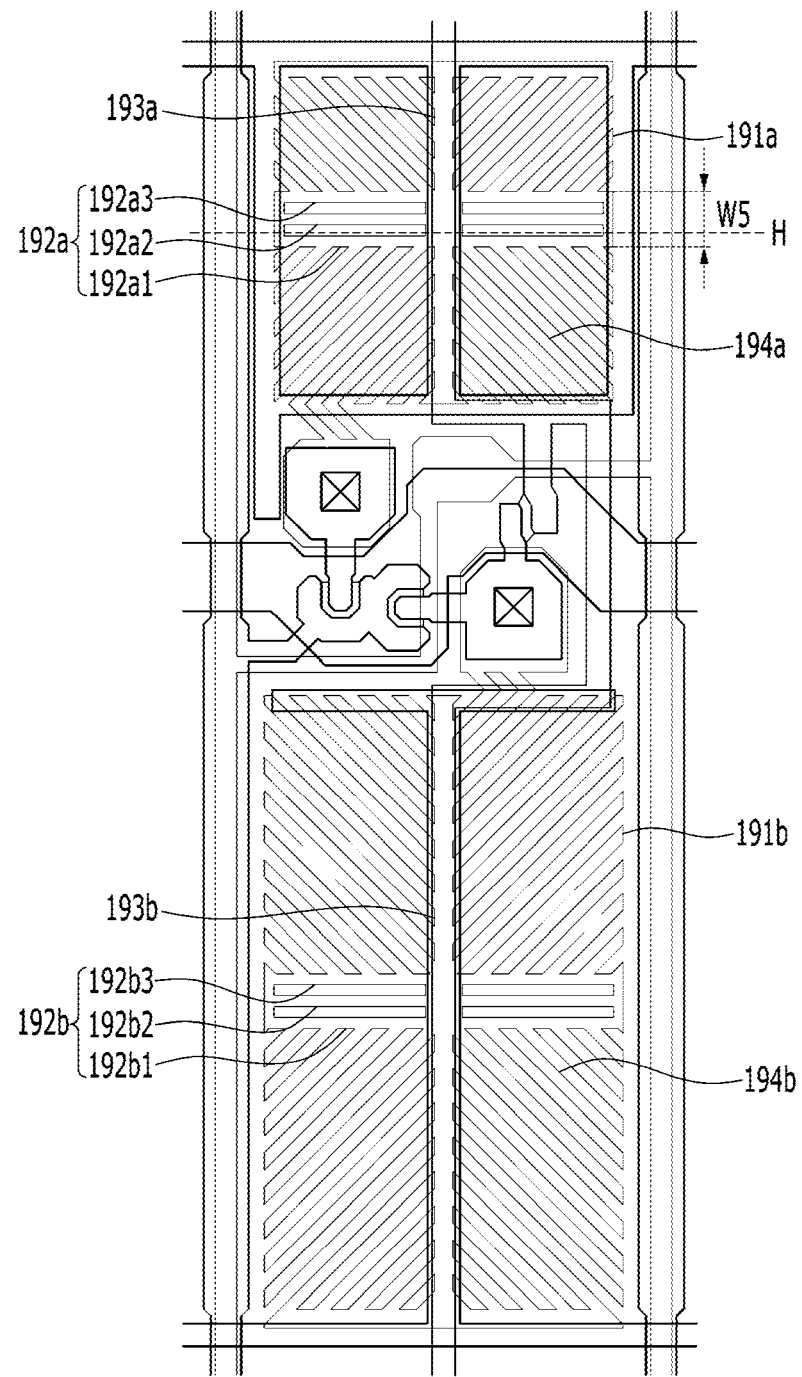
FIG. 22 is a plan view illustrating a layout of a second pixel of a liquid crystal display, according to one or more exemplary embodiments.
Figure 23:
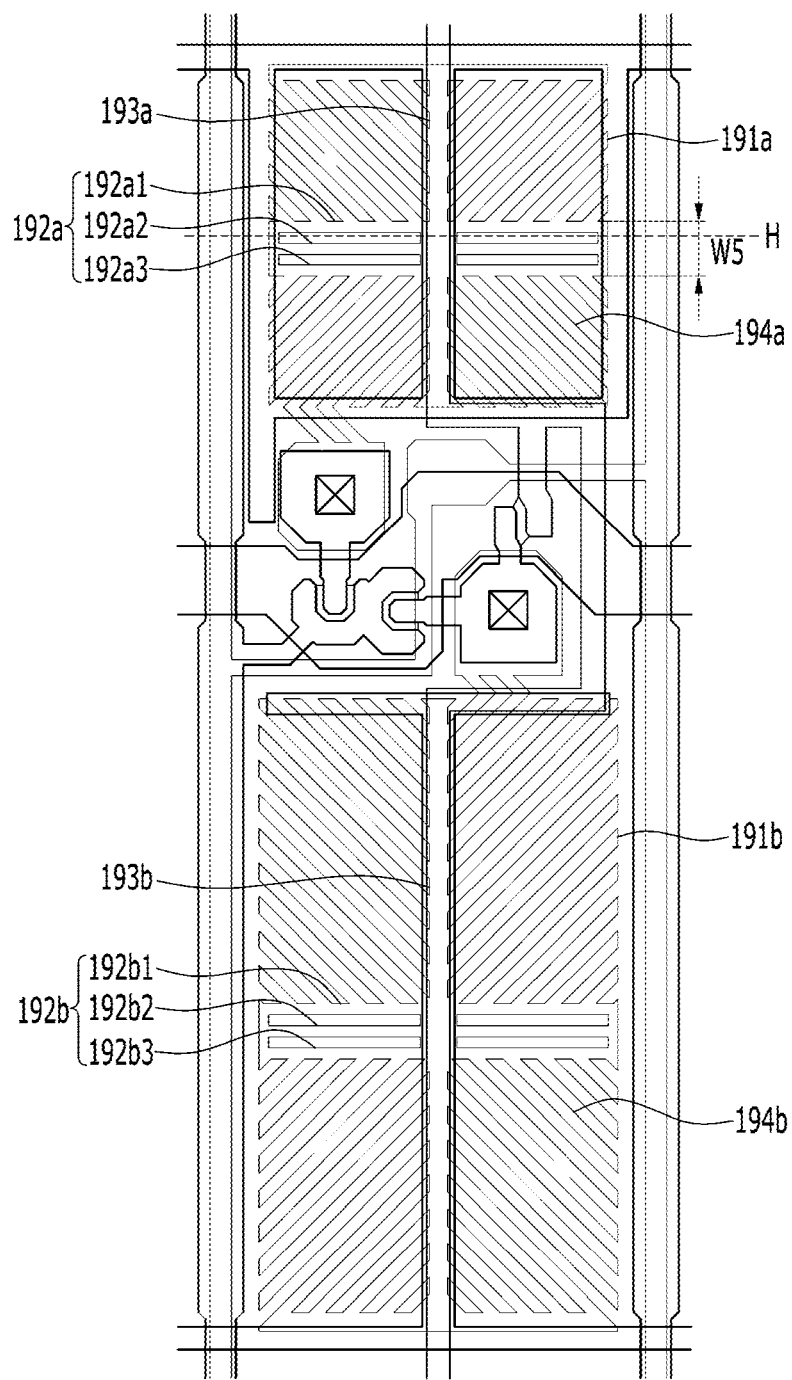
FIG. 23 is a plan view illustrating a layout of a third pixel of a liquid crystal display, according to one or more exemplary embodiments.

Next, the liquid crystal display and the pixel arrangement according to one or more exemplary embodiments will be described with reference to FIGS. 20, 21, 22, and FIG. 23. FIG. 20 is a conceptual view of a liquid crystal display and a pixel arrangement according to the exemplary embodiments. FIG. 21 is a plan view illustrating a layout of a first pixel of a liquid crystal display, according to the exemplary embodiments. FIG. 22 is a plan view illustrating a layout of a second pixel of a liquid crystal display, according to the exemplary embodiments. FIG. 23 is a plan view illustrating a layout of a third pixel of a liquid crystal display, according to the exemplary embodiments.

Referring to FIG. 20, the liquid crystal display according to the exemplary embodiments is curved to have a curvature R according to the second direction Y. The first pixel PXA is disposed in the center portion of the liquid crystal display along the second direction Y, the second pixel PXB is disposed on a upward side with respect to the first pixel PXA along the second direction Y, and the third pixel PXC is disposed on a downward side with respect to the second direction Y.

The first, second, and third pixels of the liquid crystal display according to the exemplary embodiments will be described with reference to FIGS. 21, 22, and 23.

Referring to FIG. 21, the first pixel PXA of the liquid crystal display according to the present exemplary embodiments is substantially the same as the first pixel PXA described with reference to FIGS. 1, 5, 12, and 17.

The entire shape of the first sub-pixel electrode 191a of the pixel electrode 191 of the first pixel PXA is a quadrangle, and includes a cross-shaped stem including the first horizontal stem 192a and the first vertical stem 193a and a plurality of branch electrodes 194a extending from the cross-shaped stem.

The entire shape of the second sub-pixel electrode 191b of the pixel electrode 191 of the first pixel PXA is a quadrangle, and includes the cross-shaped stem including the second horizontal stem 192b and the second vertical stem 193b and a plurality of branch electrodes 194b extending from the cross-shaped stem.

Referring to FIG. 22, the first pixel PXA of the liquid crystal display according to the present exemplary embodiments is substantially similar to the second pixel PXB described with reference to FIGS. 2 and 6.

The entire shape of the first sub-pixel electrode 191a of the pixel electrode 191 of the second pixel PXB is a quadrangle, and includes the cross-shaped stem including the first horizontal stem 192a and the first vertical stem 193a and the plurality of branch electrodes 194a extending from the cross-shaped stem.

The entire shape of the second sub-pixel electrode 191b of the pixel electrode 191 of the second pixel PXB is a quadrangle, and includes the cross-shaped stem including the second horizontal stem 192b and the second vertical stem 193b and the plurality of branch electrodes 194b extending from the cross-shaped stem.

The first horizontal stem 192a of the first sub-pixel electrode 191a of the second pixel PXB includes a plurality of first horizontal branch portions 192a1, 192a2, and 192a3 disposed along the length direction of the first horizontal stem 192a and extending parallel to each other.

The second horizontal stem 192b of the second sub-pixel electrode 191b of the second pixel PXB includes a plurality of second horizontal branch portions 192b1, 192b2, and 192b3 disposed along the length direction of the second horizontal stem 192b and extending parallel to each other.

Also, the fifth width W5 of the first horizontal stem 192a and the second horizontal stem 192b of the second pixel PXB is larger than the fourth width W4 of the first horizontal stem 192a and the second horizontal stem 192b of the first sub-pixel electrode 191a of the first pixel PXA.

The first horizontal branch portion 192a1 of the first horizontal stem 192a of the first sub-pixel electrode 191a of the second pixel PXB overlaps the horizontal center line H of the first sub-pixel electrode 191a, and the rest of the plurality of first horizontal branch portions 192a2 and 192a3 of the first horizontal stem 192a are disposed on one direction with reference to the horizontal center line H of the first sub-pixel electrode 191a. Referring to FIG. 22, the rest of the plurality of first horizontal branch portions 192a2 and 192a3 of the first horizontal stem 192a are disposed on an upward side with reference to the horizontal center line H of the first sub-pixel electrode 191a.

The second horizontal branch portion 192b1 of the second horizontal stem 192b of the second sub-pixel electrode 191b of the second pixel PXB overlaps the horizontal center line H of the second sub-pixel electrode 191b, however the rest of the plurality of second horizontal branch portions 192b2 and 192b3 of the second horizontal stem 192b are disposed on one side with reference to the horizontal center line H of the second sub-pixel electrode 191b. Referring to FIG. 22, the rest of the plurality of second horizontal branch portions 192b2 and 192b3 of the second horizontal stem 192b are disposed on an upward side with reference to the horizontal center line H of the second sub-pixel electrode 191b.

Accordingly, the first horizontal stem 192a and the second horizontal stem 192b of the second pixel PXB includes the plurality of horizontal branch portions spaced apart by the openings and are wider than the first horizontal stem 192a and the second horizontal stem 192b of the first pixel PXA, the first horizontal branch portion 192a1 and the second horizontal branch portion 192b1 of the first horizontal stem 192a and the second horizontal stem 192b are disposed in the horizontal center portion of the sub-pixel electrodes 191a and 191b, and the rest of the plurality of horizontal branch portions are disposed on one side with reference to the horizontal center portion of the sub-pixel electrodes 191a and 191b.

The first minute branches 194a1 extend diagonally in an upper left direction from the horizontal stem 192 or the vertical stem 193, and the second minute branches 194b1 extend diagonally in an upper right direction from the horizontal stem 192 or the vertical stem 193. The third minute branches 194c1 extend in a lower left direction from the horizontal stem 192 or the vertical stem 193, and the fourth minute branches 194d1 extend diagonally in a lower right direction from the horizontal stem 192 or the vertical stem 193.

The first to fourth minute branches 194a1, 194b1, 194c1, and 194d1 form an angle of approximately 45° or 135° with gate lines 121 or the horizontal stem 192. Further, the minute branches 194a1, 194b1, 194c1, and 194d1 of two adjacent subregions Da, Db, Dc, and Dd may be orthogonal to each other.

Since one pixel electrode 191 of the second pixel PXB includes five subregions including the four subregions Da, Db, Dc, and Dd in which the minute branches 194a1, 194b1, 194c1, and 194d1 extend in different directions from each other and a sixth subregion including the horizontal stem 192, the liquid crystal molecules 31 includes five domains in which the liquid crystal molecules 31 of the liquid crystal layer 3 may be inclined in substantially five directions.

Particularly, in the sixth subregion including the horizontal stem 192, the inclination direction of the liquid crystal molecules 31 form an angle within substantially 45° with respect to the inclination direction of the liquid crystal molecules 31 in the first to fourth subregions Da, Db, Dc, and Dd.

The sixth subregion is disposed biased to one side with reference to the horizontal center line H, and as shown in FIG. 22, the sixth subregion of the second pixel PXB is disposed on upward side with reference to the horizontal center line H of the pixel electrode.

Referring to FIG. 23, the third pixel PXC of the liquid crystal display according to the present exemplary embodiments is substantially similar to the third pixel PXC described with reference to FIGS. 3 and 7.

The entire shape of the first sub-pixel electrode 191a of the pixel electrode 191 of the third pixel PXC is a quadrangle, and includes the cross-shaped stem including the first horizontal stem 192a and the first vertical stem 193a and the plurality of branch electrodes 194a extending from the cross-shaped stem.

The entire shape of the second sub-pixel electrode 191b of the pixel electrode 191 of the third pixel PXC is a quadrangle, and includes the cross-shaped stem including the second horizontal stem 192b and the second vertical stem 193b and the plurality of branch electrodes 194b extending from the cross-shaped stem.

The first horizontal stem 192a of the first sub-pixel electrode 191a of the third pixel PXC includes a plurality of first horizontal branch portions 192a1, 192a2, and 192a3 disposed along the length direction and extending parallel to each other.

The second horizontal stem 192b of the second sub-pixel electrode 191b of the third pixel PXC includes a plurality of second horizontal branch portions 192b1, 192b2, and 192b3 disposed along the length direction of the second horizontal stem 192b and extending parallel to each other.

Also, the fifth width W5 of the first horizontal stem 192a and the second horizontal stem 192b of the third pixel PXC is larger than the fourth width W4 of the first horizontal stem 192a and the second horizontal stem 192b of the first sub-pixel electrode 191a of the first pixel PXA.

The first horizontal branch portion 192a1 of the first horizontal stem 192a of the first sub-pixel electrode 191a of the third pixel PXC overlaps the horizontal center line H of the first sub-pixel electrode 191a, and the rest of the plurality of first horizontal branch portions 192a2 and 192a3 of the first horizontal stem 192a are disposed on one direction with reference to the horizontal center line H of the first sub-pixel electrode 191a. Referring to FIG. 23, the rest of the plurality of first horizontal branch portions 192a2 and 192a3 of the first horizontal stem 192a are disposed on a downward side with reference to the horizontal center line H of the first sub-pixel electrode 191a.

The second horizontal branch portion 192b1 of the second horizontal stem 192b of the second sub-pixel electrode 191b of the third pixel PXC overlaps the horizontal center line H of the second sub-pixel electrode 191b, however the rest of the plurality of second horizontal branch portions 192b2 and 192b3 of the second horizontal stem 192b are disposed on one side with reference to the horizontal center line H of the second sub-pixel electrode 191b. Referring to FIG. 23, the rest of the plurality of second horizontal branch portions 192b2 and 192b3 of the second horizontal stem 192b are disposed on a downward side with reference to the horizontal center line H of the second sub-pixel electrode 191b.

Accordingly, the first horizontal stem 192a and the second horizontal stem 192b of the second pixel PXB include a plurality of horizontal branch portions spaced apart by the openings and are wider than the first horizontal stem 192a and the second horizontal stem 192b of the first pixel PXA, the first horizontal branch portion 192a1 and the second horizontal branch portion 192b1 of the first horizontal stem 192a and the second horizontal stem 192b are disposed in the horizontal center portion of the sub-pixel electrodes 191a and 191b, and the rest of the plurality of horizontal branch portions are disposed on one side with reference to the horizontal center portion of the sub-pixel electrodes 191a and 191b.

The first minute branches 194a1 extend diagonally in an upper left direction from the horizontal stem 192 or the vertical stem 193, and the second minute branches 194b1 extend diagonally in an upper right direction from the horizontal stem 192 or the vertical stem 193. The third minute branches 194c1 extend in a lower left direction from the horizontal stem 192 or the vertical stem 193, and the fourth minute branches 194d1 extend diagonally in a lower right direction from the horizontal stem 192 or the vertical stem 193.

The first to fourth minute branches 194a1, 194b1, 194c1, and 194d1 form an angle of approximately 45° or 135° with gate lines 121 or the horizontal stem 192. Further, the minute branches 194a1, 194b1, 194c1, and 194d1 of the two adjacent subregions Da, Db, Dc, and Dd may be orthogonal to each other.

Since one pixel electrode 191 of the second pixel PXB includes five subregions including the four subregions Da, Db, Dc, and Dd in which the minute branches 194a1, 194b1, 194c1, and 194d1 extend in different directions from each other and a sixth subregion including the horizontal stem 192, the liquid crystal molecules 31 includes five domains in which the liquid crystal molecules 31 of the liquid crystal layer 3 may be inclined in substantially five directions.

Particularly, in the sixth subregion including the horizontal stem 192, the inclination direction of the liquid crystal molecules 31 form an angle within substantially 45° by the inclination direction of the liquid crystal molecules 31 in the first to fourth subregions Da, Db, Dc, and Dd.

The sixth subregion is disposed biased to one side with reference to the horizontal center line H, and as shown in FIG. 22, the sixth subregion of the second pixel PXB is disposed on downward side with reference to the horizontal center line H of the pixel electrode.

Referring to FIGS. 11, 17, and 21, the liquid crystal display according to the exemplary embodiments may include the first pixel disposed in the center portion of the curved liquid crystal display, the second pixel disposed on the first side with respect to the first pixel along the curvature center axis of the curved liquid crystal display, and the third pixel disposed on the second side with respect to the first pixel along the curvature center axis of the curved liquid crystal display, the first, second, and third pixels including the pixel electrode including the cross-shaped stem and the plurality of branch electrodes extending therefrom. The pixel electrode of the second pixel includes the stem extending in the direction perpendicular to the curvature center axis of the pixel and the plurality of branch portions disposed on the first side with respect to the first pixel along the curvature center axis, and the pixel electrode of the third pixel includes the plurality of branch portion disposed on the second side with respect to the first pixel along the curvature center axis.

Also, as the pixel is disposed father away from the first pixel positioned in the center of the curved liquid crystal display, the width of the stem including the plurality of branch portions may be increased.

Accordingly, the horizontal stem and/or the vertical stem of the pixel electrode of the liquid crystal display is disposed to include the plurality of branch portions, and the plurality of branch portions of the stem are disposed on one side with reference to the center axis of the pixel electrode, and therefore, when the external force is applied to the liquid crystal display generating misalignment between the lower display panel 100 and the upper display panel 200, the liquid crystal molecules may be inclined in the direction substantially parallel to the plurality of branch portions in the misalignment region where the misalignment is generated, and thereby the liquid crystal molecules in the misalignment region may be inclined in the similar direction with respect to the liquid crystal molecules in each domain. Accordingly, when the misalignment is generated between two substrates of the liquid crystal display, the display quality deterioration of the liquid crystal display may be reduced or prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
a first substrate; and
pixel electrodes disposed on the first substrate, each of the pixel electrodes comprising:
a stem comprising a first stem and a second stem perpendicularly crossing each other; and
a plurality of branch electrodes extending from the stem,
wherein the pixel electrodes comprise a first pixel electrode in a first pixel, second pixel electrodes separated from the first pixel electrode and disposed in second pixels, and third pixel electrodes separated from the first pixel electrode and disposed in third pixels, wherein: the first pixel is disposed on a center of the liquid crystal display; the second pixels are disposed on a first side of the first pixel along a first direction; and the third pixels are disposed on a second side, opposite of the first side of the first pixel along the first direction, and wherein one of the first stem of the second and third pixel electrodes and the second stem of the second and third pixel electrodes have a width greater than a width of a corresponding stem of the first pixel electrodes, wherein the first stem of each of the first, second, and third pixel electrodes extends in a direction perpendicular to the first direction, wherein the first stem of the second pixel electrodes are disposed on the first side with reference to a center line of each of the second pixel electrodes parallel to the first stem, and wherein the first stem of the third pixel electrodes are disposed on the second side with reference to a center line of each of the third pixel electrodes parallel to the first stem.

2. The liquid crystal display of claim 1, wherein the liquid crystal display is curved, having a curvature along the first direction.

3. The liquid crystal display of claim 2, further comprising a gate line and a data line disposed on the first substrate, wherein the first direction is substantially parallel to a direction that at least one of the gate line and the data line extends.

4. The liquid crystal display of claim 3, wherein a width of the first stem of each of the second pixel electrodes increases as the second pixels are disposed farther away from the first pixel, and a width of the first stem of each of the third pixel electrodes increases as the third pixels are disposed farther away from the first pixel.

5. The liquid crystal display of claim 4, wherein the first stem of each of the second pixel electrodes comprise a plurality of first branch portions disposed parallel to each other, the first each of stem of the third pixel electrodes comprise a plurality of first branch portions disposed parallel to each other, the plurality of first branch portions of the second pixel electrodes are disposed on the first side with reference to a center line of each of the second pixel electrodes, and the plurality of first branch portions of the third pixel electrodes are disposed on the second side with reference to a center line of each of the third pixel electrodes.

6. The liquid crystal display of claim 5, wherein the plurality of branch electrodes extend in four different directions from the stem.

7. The liquid crystal display of claim 6, wherein the plurality of branch electrodes of the second pixel electrodes extend at an angle within substantially 45 degrees with respect to the first stem of the second pixel electrodes, and the plurality of branch electrodes of the third pixel electrodes extend at an angle within substantially 45 degrees with respect to the first stem of the third pixel electrodes.

8. The liquid crystal display of claim 3, wherein: the first stem of each of the second pixel electrodes comprise a plurality of first branch portions parallel to each other, the first stem of each of the third pixel electrodes comprise a plurality of first branch portions parallel to each other, the plurality of first branch portion of the second pixel electrodes are disposed on the first side with reference to a center line of each of the second pixel electrodes, and the plurality of first branch portions of the third pixel electrodes are disposed on the second side with reference to a center line of each of the third pixel electrodes.

9. The liquid crystal display of claim 8, wherein the plurality of branch electrodes extend in four different directions from the stem.

10. The liquid crystal display of claim 9, wherein the plurality of branch electrodes of the second pixel electrodes extend at an angle within substantially 45 degrees with respect to the first stem of the second pixel electrodes, and the plurality of branch electrodes of the third pixel electrodes extends at an angle within substantially 45 degrees with respect to the first stem of the third pixel electrodes.

11. The liquid crystal display of claim 1, further comprising a gate line and a data line disposed on the first substrate, wherein the first direction is substantially parallel to a direction that at least one of the gate line and the data line extends.

12. The liquid crystal display of claim 11, wherein a width of the first stem of each of the second pixel electrodes increases as each of the second pixels are disposed farther away from the first pixel, and a width of the first stem of each of the third pixel electrodes increase as each of the third pixels are disposed farther away from the first pixel.

13. The liquid crystal display of claim 12, wherein the first stem of each of the second pixel electrodes comprise a plurality of first branch portions disposed parallel to each other, the first stem of each of the third pixel electrodes comprise a plurality of first branch portions disposed parallel to each other, the plurality of first branch portions of the second pixel electrodes are disposed on the first side with reference to a center line of each of the second pixel electrode, and the plurality of first branch portions of the third pixel electrodes are disposed on the second side with reference to a center line of each of the third pixel electrode.

14. The liquid crystal display of claim 13, wherein the plurality of branch electrodes extend in four different directions from the stem.

15. The liquid crystal display of claim 14, wherein the plurality of branch electrodes of the second pixel electrodes extend at an angle within substantially 45 degrees with respect to the first stem of each of the second pixel electrodes, and the plurality of branch electrodes of the third pixel electrodes extend at an angle within substantially 45 degrees with respect to the first stem of each of the third pixel electrodes.

16. The liquid crystal display of claim 11, wherein the first stem of each of the second pixel electrodes comprise a plurality of first branch portions parallel to each other, the first stem of each of the third pixel electrodes comprise a plurality of first branch portions parallel to each other, the plurality of first branch portions of the second pixel electrodes are disposed on the first side with reference to a center line of each of the second pixel electrodes, and the plurality of first branch portions of the third pixel electrodes are disposed on the second side with reference to a center line of each of the third pixel electrodes.

17. The liquid crystal display of claim 16, wherein the plurality of branch electrodes extend in four different directions from the stem.

18. The liquid crystal display of claim 17, wherein the plurality of branch electrodes of the second pixel electrodes extend at an angle within substantially 45 degrees with respect to the first stem of the second pixel electrodes, and the plurality of branch electrodes of the third pixel electrodes extend at an angle within substantially 45 degrees with respect to the first stem of the third pixel electrodes.

19. A liquid crystal display comprising:
a first substrate;
a gate line and a data line disposed on the first substrate;
a first pixel disposed on the first substrate, the first pixel comprising a first domain, a second domain, a third domain, and a fourth domain;
second pixels and third pixels disposed on the first substrate, the second pixels and the third pixels respectively comprising a first domain, a second domain, a third domain, a fourth domain, and a fifth domain; and
a liquid crystal layer including liquid crystal molecules,
wherein the liquid crystal molecules disposed in the first domain, the second domain, the third domain, and the fourth domain of the first pixel, second pixels, and third pixels are respectively inclined in four different directions with reference to the gate line and the data line,
wherein the first domain, the second domain, the third domain, the fourth domain, and the fifth domain respectively comprises a plurality of branch electrodes disposed parallel to each other,
wherein the fifth domain is defined by a horizontal stem and a vertical stem, the vertical stem comprising vertical branch electrodes,
wherein a width of the fifth domain of the second pixels and the third pixels is different corresponding to a location of each of the second pixels and the third pixels,
wherein the first pixel is disposed in the center of the liquid crystal display along a first direction, the second pixels are disposed on a first side with respect to the first pixel along the first direction, and the third pixels are disposed on a second side, opposite of the first side with respect to the first pixel along the first direction,
wherein the fifth domain of the second pixel electrodes are disposed on the first side with reference to a center line of each of the second pixel electrodes perpendicular to the first direction, and
wherein the fifth domain of the third pixel electrodes are disposed on the second side with reference to a center line of each of the third pixel electrodes perpendicular to the first direction.

20. The liquid crystal display of claim 19, wherein the liquid crystal display is curved having a curvature along a first curvature direction parallel to the first direction.

21. The liquid crystal display of claim 20, wherein the first curvature direction is parallel to a direction that at least one of the gate line and the data line extends.

22. The liquid crystal display of claim 21, wherein the width of the fifth domain of each of the second pixels increase as the second pixels are disposed farther away from the first pixel, and the width of the fifth domain of each of the third pixels increase as the third pixels are disposed farther away from the first pixel.

23. The liquid crystal display of claim 22, wherein the fifth domain of each of the second pixels and the third pixels extends in a direction perpendicular to the first curvature direction.

24. The liquid crystal display of claim 23, wherein the liquid crystal molecules disposed in the fifth domain of the second pixels and the third pixels are pretilted to form an angle within substantially 45 degrees with respect to the liquid crystal molecules disposed in the first domain, the second domain, the third domain, and the fourth domain.

25. The liquid crystal display of claim 20, wherein the fifth domain of each of the second pixels and the third pixels extends in the direction perpendicular to the first curvature direction.

26. The liquid crystal display of claim 25, wherein the liquid crystal molecules disposed in the fifth domain of the second pixels and the third pixels are pretilted to form an angle within substantially 45 degrees with respect to the liquid crystal molecules disposed in the first domain, the second, the third domain, and the fourth domain.

27. The liquid crystal display of claim 19, wherein the width of the fifth domain of each of the second pixels increase as the second pixels are disposed farther away from the first pixel, and the width of the fifth domain of each of the third pixels increase as the third pixels are disposed farther away from the first pixel.

28. The liquid crystal display of claim 27, wherein the fifth domain of each of the second pixels and the third pixels extends in a direction perpendicular to the first direction.

29. The liquid crystal display of claim 28, wherein the liquid crystal molecules disposed in the fifth domain of the second pixels and the third pixels are pretilted to form an angle within substantially 45 degrees with respect to the liquid crystal molecules disposed in the first domain, the second domain, the third domain, and the fourth domain.

30. The liquid crystal display of claim 19, wherein the fifth domain of each of the second pixels and the third pixels extends in a direction perpendicular to the first direction.

31. The liquid crystal display of claim 30, wherein the liquid crystal molecules disposed in the fifth domain of the second pixels and the third pixels are pretilted to form an angle within substantially 45 degrees with respect to the liquid crystal molecules disposed in the first domain, the second domain, the third domain, and the fourth domain.

* * * * *